United States Patent
Nitta et al.

(10) Patent No.: US 7,121,641 B2
(45) Date of Patent: Oct. 17, 2006

(54) COLOR INK-JET RECORDING APPARATUS AND METHOD AND METHOD OF PROCESSING IMAGE DATA

(75) Inventors: Masaki Nitta, Tokyo (JP); Takumi Kaneko, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/067,359

(22) Filed: Feb. 7, 2002

(65) Prior Publication Data

US 2003/0016261 A1    Jan. 23, 2003

(30) Foreign Application Priority Data

Feb. 9, 2001  (JP)  ............................. 2001-034555
Jan. 30, 2002 (JP)  ............................. 2002-022405

(51) Int. Cl.
    *B41J 2/205*    (2006.01)
(52) U.S. Cl. ............................. 347/15; 347/41; 347/43
(58) Field of Classification Search .................. 347/15, 347/43, 100, 40, 41, 14
    See application file for complete search history.

(56) References Cited

U.S. PATENT DOCUMENTS

| | | | |
|---|---|---|---|
| 5,633,663 A * | 5/1997 | Matsubara et al. | 347/41 |
| 5,661,508 A | 8/1997 | Sugimoto et al. | 347/9 |
| 5,748,207 A | 5/1998 | Inui et al. | 347/43 |
| 5,767,876 A * | 6/1998 | Koike et al. | 347/43 |
| 6,062,674 A | 5/2000 | Inui et al. | 347/43 |

FOREIGN PATENT DOCUMENTS

| | | |
|---|---|---|
| JP | 4-158049 | 6/1992 |
| JP | 5-8410 | 1/1993 |
| JP | 5-278232 | 10/1993 |
| JP | 6-219041 | 8/1994 |
| JP | 7-237346 | 9/1995 |
| JP | 8-281930 | 10/1996 |

* cited by examiner

*Primary Examiner*—Stephen Meier
*Assistant Examiner*—Lam S. Nguyen
(74) *Attorney, Agent, or Firm*—Fitzpatrick, Cella, Harper & Scinto

(57) ABSTRACT

In color ink-jet recording, even if a black image is recorded adjacent to a color image, the present invention prevents bleeding between black ink and color ink to achieve a high recording grade. In a divided recording method, as division patterns used to allot image data to each recording scan, different division patterns are provided for black image data and for color image data. The division patterns for black and another color used during the same scan have different allotment rates so that the amount of image data allotted to the same scan varies between black and the other colors. As a result, the amount of image data recorded during the same scan also varies between black and the other colors. This reduces the frequency with which the black ink and the color ink are provided adjacent to each other during the same scan.

20 Claims, 20 Drawing Sheets

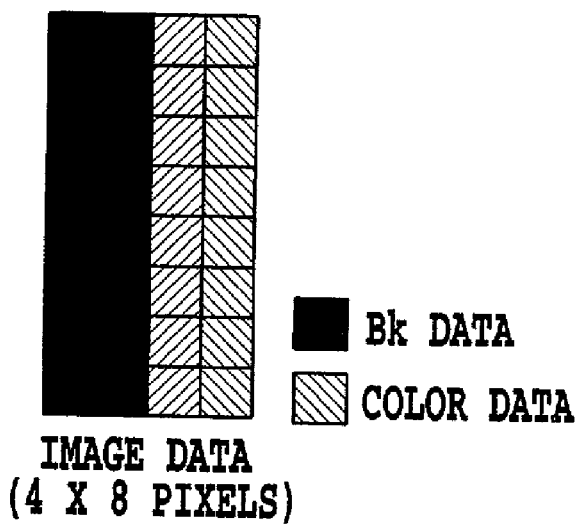
FIG.1A
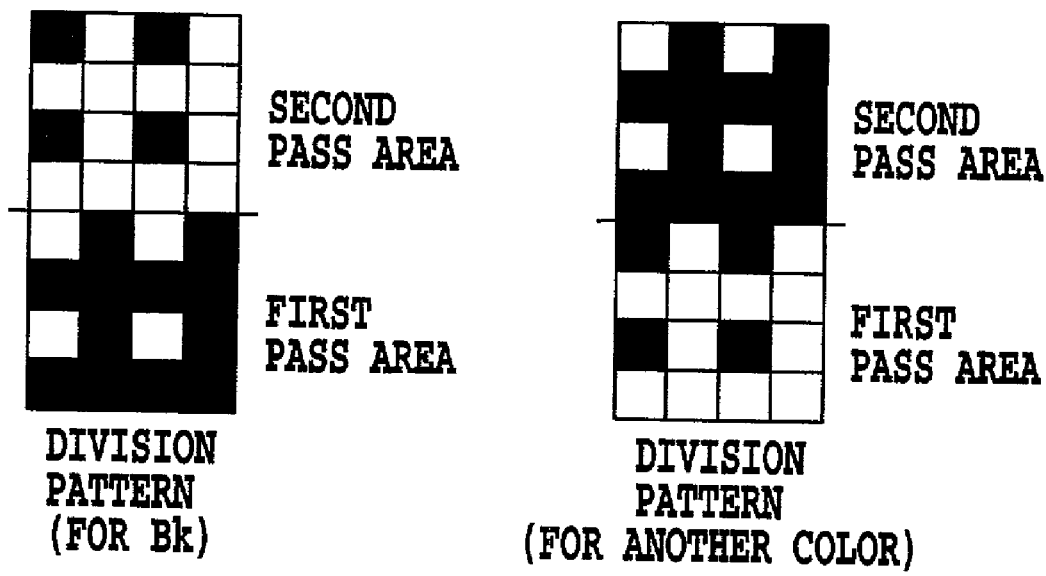
FIG.1B
FIG.1C

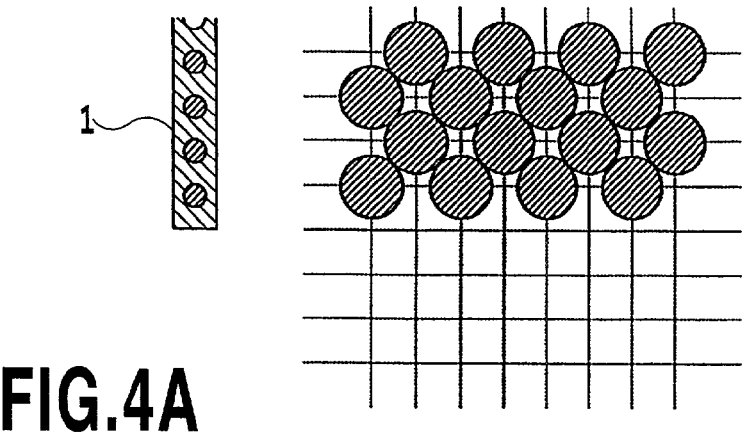
FIG.4A
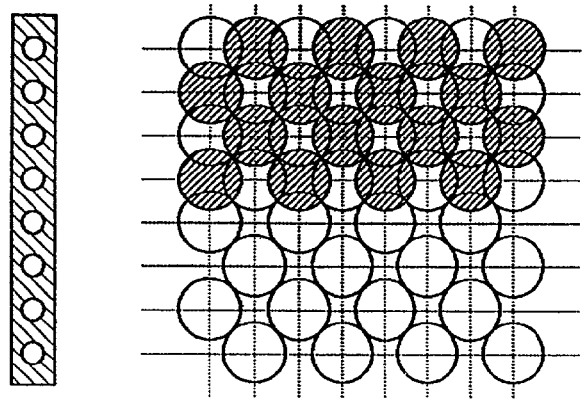
FIG.4B
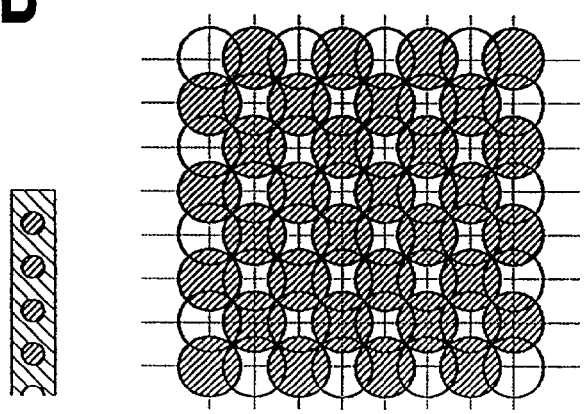
FIG.4C
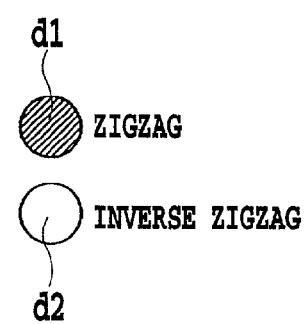

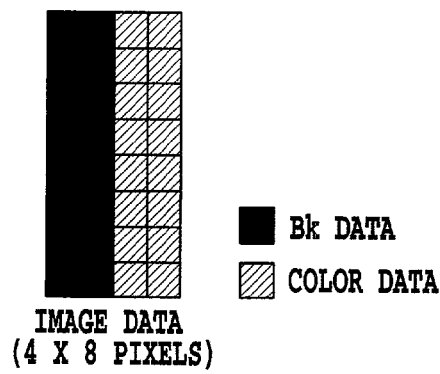
FIG.5A IMAGE DATA (4 X 8 PIXELS)
■ Bk DATA
▨ COLOR DATA
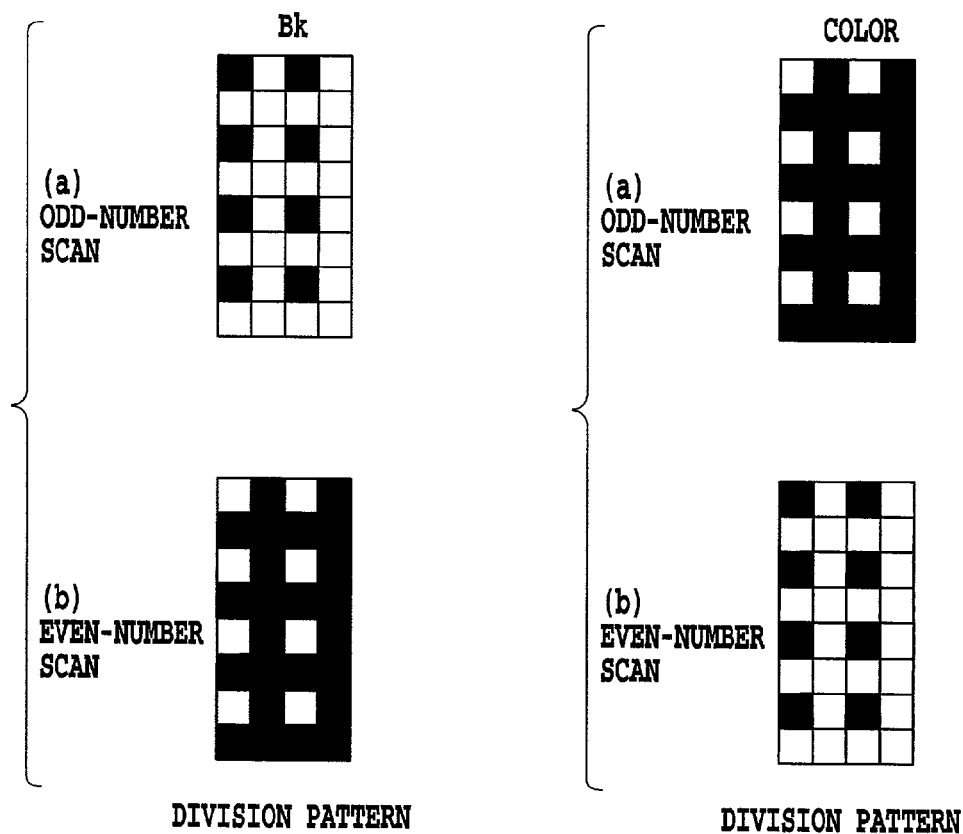
FIG.5B
(a) ODD-NUMBER SCAN
(b) EVEN-NUMBER SCAN
DIVISION PATTERN
FIG.5C
(a) ODD-NUMBER SCAN
(b) EVEN-NUMBER SCAN
DIVISION PATTERN Bk IMAGE DATA
(4 X 8 PIXELS)

CYAN
EXPANSION
PATTERN

MAGENTA
AND YELLOW
EXPANSION
PATTERN

CYAN
OVERLAPPING
DATA

MAGENTA
AND YELLOW
OVERLAPPING
DATA

DIVISION PATTERN (FOR Bk)

DIVISION PATTERN (FOR OTHER COLORS)

Bk IMAGE DATA (4 X 8 PIXELS)

CYAN OVERLAPPING DATA

MAGENTA AND YELLOW OVERLAPPING DATA

DIVISION PATTERN (FOR Bk)

DIVISION PATTERN (FOR OTHER COLORS)

Bk IMAGE DATA (4 X 8 PIXELS)

CYAN OVERLAPPING DATA

MAGENTA AND YELLOW OVERLAPPING DATA

DIVISION PATTERN (FOR Bk)

DIVISION PATTERN (FOR OTHER COLORS)

Bk THINNED DATA (4 X 8 PIXELS)

CYAN OVERLAPPING DATA

MAGENTA AND YELLOW OVERLAPPING DATA

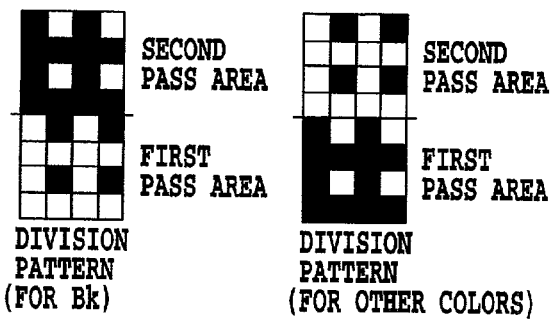
FIG.11A    FIG.11B
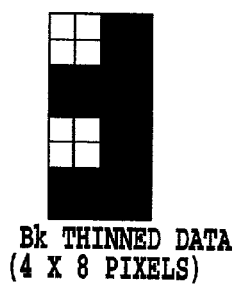    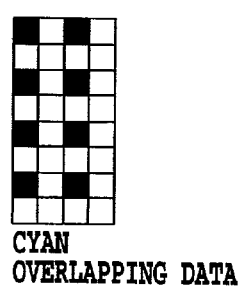    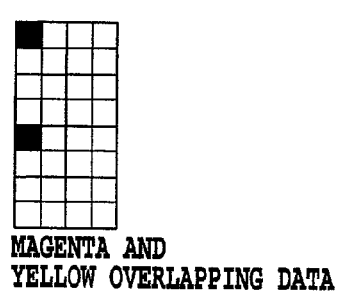
FIG.11C    FIG.11D    FIG.11E

FIG.12A  FIG.12B

Bk THINNED DATA
(4 X 8 PIXELS)

CYAN
OVERLAPPING DATA

MAGENTA AND
YELLOW OVERLAPPING DATA

COLOR INK-JET RECORDING APPARATUS AND METHOD AND METHOD OF PROCESSING IMAGE DATA

This application is based on Patent Application No. 2001-034555 filed Feb. 9, 2001 in Japan, the content of which is incorporated hereinto by reference.

BACKGROUND OF THE INVENTION

1. Field of the Invention

The present invention relates to a color ink-jet recording apparatus that can clearly and densely record color images, and more specifically, to a color ink-jet recording apparatus and method using color ink such as yellow (Y), magenta (M), cyan (C) ink or green (G), red (R), and blue (B) ink as well as black (Bk) ink. The present invention further relates to a method of processing image data used in a color ink-jet recording apparatus.

2. Description of the Related Art

The present invention is applicable to every equipment using recording media such as paper, cloths, and OHP sheets. Specific applied equipment includes, for example, printers, copiers, and facsimile terminal equipment.

Ink-jet recording apparatuses are widely used for printers, copiers, and facsimile terminal equipment because they can be driven with low noise and low running costs and because they allow their sizes to be easily reduced and also allow color ink to be easily introduced.

In general, these color ink-jet recording apparatuses executes color recording using three types of color ink including cyan, magenta, and yellow ink. Alternatively, four types of color ink, that is, the above three types of ink plus black ink may used for color recording.

A conventional ink-jet recording method requires the use of exclusive paper having an ink absorbing layer in order to obtain color images with good coloring and no ink bleeding. However, ink has recently been improved to provide methods adapted for ordinary paper that is used for printers, copiers, and the like in large quantity. However, the grade of recording on ordinary paper still remains at an insufficient level. The greatest factor concerning this situation is the compatibility between the prevention of bleeding between a plurality of ink colors and the grade of black recording (particularly recording of black characters and thin lines).

Typically, if color images are recorded on ordinary paper using an ink-jet recording method, quickly drying ink is used which permeates through ordinary paper at high speed. The use of such ink provides a high-grade image without any ink color bleeding, but in this case, the density of the image is generally low, and what is called feathering is prone to occur in which ink bleeds slightly around each color image along fibers of the paper.

Feathering is relatively unnoticeable in color image areas, whereas it is noticeable in black image areas, thereby reducing the recording grade. In particular, if the black image is a character or a thin line, it will be dull and unclear and thus has a significantly reduced grade.

Thus, to record a black image with reduced feathering and increased density and high quality, black ink must be used which permeates through ordinary paper at a relatively low speed. However, in this case, when the black ink contacts with color ink other than the black ink on a recording medium, bleeding occurs at the boundary between the two types of ink to significantly reduce the recording grade. Thus, the prevention of bleeding between the black ink and the color ink is inconsistent with the improvement of the color image grade achieved by reducing the feathering of the black image. It is now very difficult to make these two requirements compatible. Japanese Patent Application Laid-open No. 4-158049 (1992) proposes a method comprising a plurality of heads for ink that permeates through paper at a relatively high speed for color recording and a head for ink that permeates through paper at a relatively low speed for character recording, wherein the color recording heads and the character recording head are switched depending on a recorded image. However, with this method, the character recording head must be provided separately from the conventional color recording heads, thereby increasing costs and the size of the apparatus.

What is called a divided recording method is known in which an image is formed by causing recording heads to scan the same recording area a plurality of times and in which during a recording process, the number of adjacent dots is reduced to lessen differences between nozzles in the accuracy with which ink from each nozzle impacts a recording media. This divided recording method has been known to be effective in reducing the bleeding. However, even with this divided recording method, bleeding may occur between adjacent images if the images require a relatively large mount of ink to be ejected to a recording medium.

SUMMARY OF THE INVENTION

It is thus an object of the present invention to provide an ink-jet recording technique with which if an independent black image area is recorded which contacts with no color image area, such a high recording grade is obtained that this black image is dense and undergoes little feathering and if a black image is recorded adjacent to a color image, such a high recording grade is obtained that no bleeding occurs between the black ink and the color ink, thereby achieving compatibility between high-grade black recording and high-grade color recording.

To solves the problems of the prior art, the present invention has the following construction:

A color ink-jet recording apparatus of the present invention is a color ink-jet recording apparatus using a black recording head that ejects black ink on the basis of black image data and color recording heads that ejects color ink on the basis of color image data, the color ink permeating through a recording medium at a higher speed than the black ink, the apparatus completing a record image in a predetermined recording area on the recording media by causing the recording heads to perform a plurality of scanning operations in the predetermined recording area, the apparatus comprising data dividing means, which uses division patterns for each of the recording scans to allot black image data corresponding to the predetermined recording area to each of the recording scans, and to allot color image data corresponding to the predetermined recording area to each of the recording scans, wherein the data dividing means sets different allotment rates for the division patterns for the black image data and color image data used during the same recording scan.

A color ink-jet recording method of the present invention is a color ink-jet recording method using a black recording head that ejects black ink on the basis of black image data and color recording heads that ejects color ink on the basis of color image data, the color ink permeating through a recording medium at a higher speed than the black ink, the method completing a record image in a predetermined recording area on the recording medium by causing the recording heads to perform a plurality of scanning operations in the predetermined recording area, the method comprising the steps of dividing black and color image data corresponding to the predetermined recording area into black and color image data corresponding to each of the recording scans by using division patterns for each of the recording scans to allot black image data corresponding to the predetermined recording area to each of the recording scans, while allotting color image data corresponding to the predetermined recording area to each of the recording scans; and ejecting the black ink and the color ink from the black recording head and the color recording heads during each of the recording scans on the basis of the data allotted to each of the recording scans in the dividing step; wherein the data dividing step sets different allotment rates for the division patterns for the black image data and color image data used during the same recording scan.

A method of processing image data of the present invention is a method of processing image data used in a color ink jet recording apparatus using a black recording head that ejects black ink on the basis of black image data and color recording heads that ejects color ink on the basis of color image data, the color ink permeating through a recording medium at a higher speed than the black ink, the apparatus completing a record image in a predetermined recording area on the recording medium by causing the recording heads to perform a plurality of scanning operations in the predetermined recording area, the method comprising the step of dividing black and color image data corresponding to the predetermined recording area into black and color image data corresponding to each of the recording scans by using division patterns for each of the recording scans to allot black image data corresponding to the predetermined recording area to each of the recording scans, while allotting color image data corresponding to the predetermined recording area to each of the recording scans, wherein each of the division patterns for the black image data and color image data used during the same recording scan has different allotment rates.

The above and other objects, effects, features and advantages of the present invention will become more apparent from the following description of embodiments thereof taken in conjunction with the accompanying drawings.

BRIEF DESCRIPTION OF THE DRAWINGS

FIGS. 1A to 1D are explanatory representations showing a recording process according to a first embodiment of the present invention;

FIGS. 4A to 4C are explanatory representations showing a recorded state achieved by a divided recording method;

FIGS. 5A to 5D are explanatory representations showing a recording process according to a second embodiment of the present invention;

FIGS. 11A to 11F are explanatory representations showing a recording process according to a sixth embodiment of the present invention; and FIGS. 12A to 12F are explanatory representations showing a recording process according to a seventh embodiment of the present invention.

DESCRIPTION OF THE PREFERRED EMBODIMENT

Figure 1D:
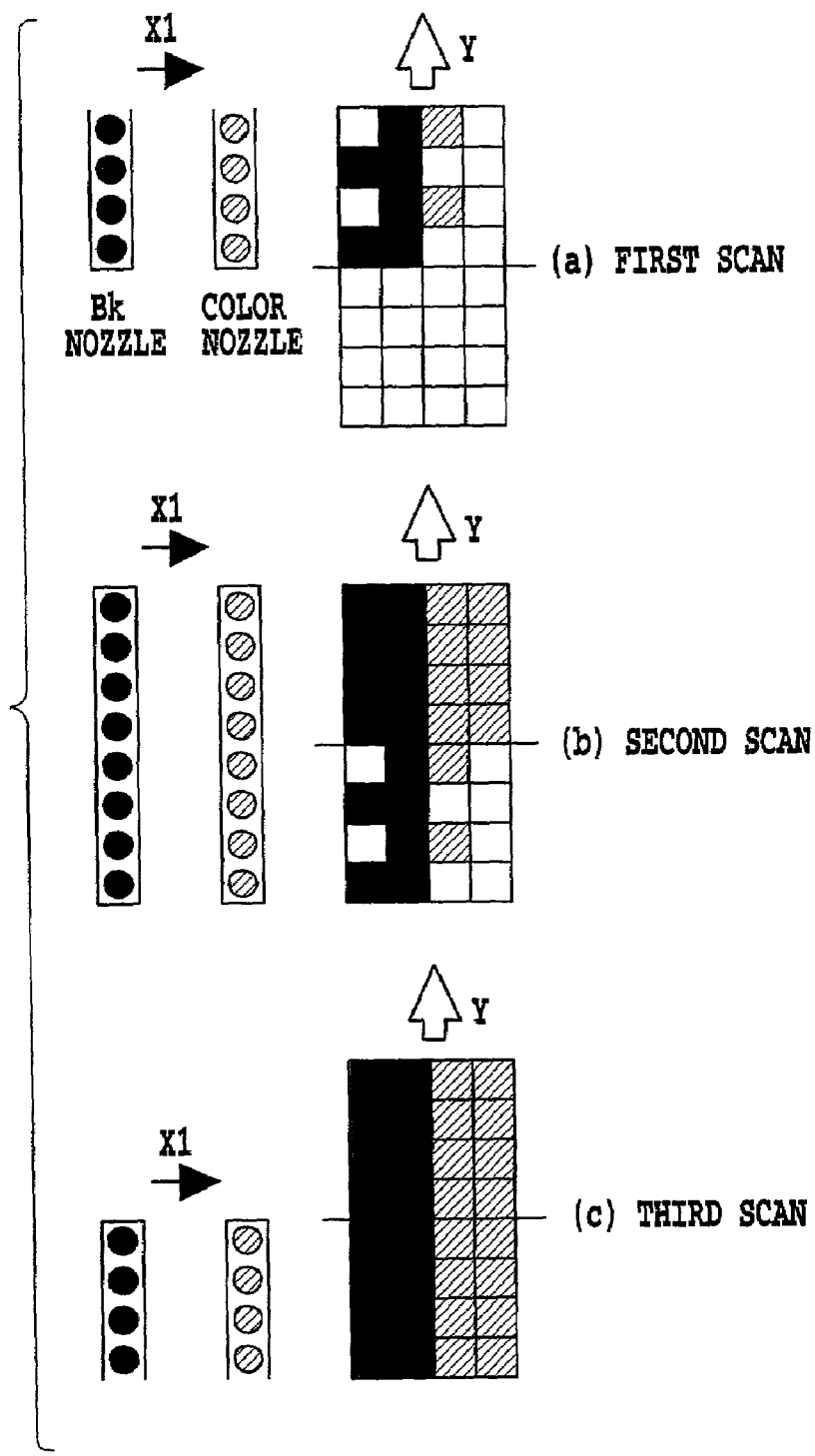

An embodiment of the present invention will be described below.

This embodiment uses a divided recording method, which is known to reduce differences between nozzles. This divided recording method also has the advantage of reducing bleeding by reducing the number of adjacent dots. With reference to FIGS. 4A to 4C, an explanation will be given of how an image is formed using this divided recording method. According to the divided recording method, recording heads performs three scanning operations to complete the recording area shown in FIG. 4C. A 4-pixel unit corresponding to half of this recording area is completed with two passes. In this case, the eight nozzles of a recording head 1 are divided into a group of upper four nozzles and a group of lower four nozzles. During a single scanning operation, dots are sequentially recorded zigzag in a scanning direction. That is, first, during the first scan, the lower four nozzles are used to print dots d1 with a zigzag pattern (see FIG. 4A). Next, during the second scan, the sheet is fed by four pixels (half the length of the recording head), and dots d2 are printed with an inverse zigzag pattern (see FIG. 4B). Furthermore, during the third scan, the sheet is fed by four pixels again, and a zigzag pattern is recorded again (see FIG. 4C). By thus sequentially feeding the sheet by four pixels and alternately recording the zigzag and inverse zigzag patterns, the 4-pixel-unit recording area is completed during each scan. With this divided recording method, an image area is completed using a plurality of scanning operations, so that the amount of ink impacting a recording medium during each operation is reduced compared to 1-pass recording, thereby lessening bleeding between the black ink and the color ink. However, even with the divided recording method, if the image to be formed is dense, the amount of ink provided increases to possibly cause bleeding between the black ink and the color ink.

Thus, in this embodiment, to use different recording duty ratios for the black ink and for the color ink during each pass, different amounts of data are allotted to the black color and to the color ink for the same pass (same recording scanning). That is, for the same pass, the allotment rate of a division pattern for black image data is different from the allotment rate of a division pattern for color image data. For example, for a pass during which the black image data is allotted using a division pattern with a high allotment rate so as to increase the recording duty of the black ink, the color image data is allotted using a division pattern with a low allotment rate so as to reduce the recording duty of the color ink. On the other hand, for a pass during which the black image data is allotted using a division pattern with a low allotment rate so as to reduce the recording duty of the black ink, the color image data is allotted using a division pattern with a high allotment rate so as to increase the recording duty of the color ink. By thus using, for the same pass, different allotment rates for the black image data and for the color image data, the frequency with which the black ink and color ink simultaneously impact the recording medium is reduced. This prevents a possible contact between the black ink and the color ink, which may cause bleeding.

Further, in this embodiment, when a black image is to be formed, at least one of the plural types of color ink is caused to impact the recording medium before or after black ink. By thus causing the color ink, which permeates through the recording medium at high speed (high settlability), to impact the recording medium before or after the black ink, which permeates through the medium at a relatively low speed (low settlability), the surface of the recording medium becomes more wettable. That is, an interface allowing the ink to properly permeate therethrough is formed to allow the black ink to settle therein more appropriately, thereby obtaining a high-grade colored image in which bleeding between the black ink and the color ink is prevented. However, if a relatively large amount of black ink is caused to impact the recording medium, the plural types of color ink caused to impact the medium before or after the black ink may cause the overflow of the ink. This phenomenon can be prevented by thinning the black image data at a certain rate. Further, by adjusting the thinning rate for the black data, the amount of the plural types of color ink caused to impact the recording medium before the black ink can be adjusted to optimize the ejection of the ink depending on the combination of the ink and recording medium used, thereby further improving the bleeding prevention effect. To prevent the formation of what is called a void image, in which the thinning of the black data causes the underlying recording medium to be exposed, and a decrease in the density of black, it is also effective to provide supplementary data on plural types of color ink so that the plurality of ink types are mixed together to form a black image at each pixel from which black data has been thinned.

If the plural types of color ink, which permeates through the recording medium at high speed, is caused to impact the medium before or after the black ink, as described previously, it is known that the bleeding between the black ink and the color ink is effectively prevented whether the color ink is deposited on the recording medium before or after the black ink. However, when the color ink is caused to impact the recording medium before the black ink, the recording medium becomes more wettable to allow the black ink provided later to settle therein more appropriately because the color ink is deposited on the medium as an underlayer. Thus, the bleeding between the black ink and the color ink is more effectively prevented.

Thus, in the present invention, if the recording heads perform scanning operations for recording in only one direction, the recording operation is performed only in a recording direction in which the color recording heads are arranged in front of the black recording head. With this arrangement, the color ink is always caused to impact the recording medium before the black ink, thereby maximizing the effect of prevention of the bleeding between the black ink and the color ink.

Further, in the present invention, a bidirectional recording operation is performed to prevent a decrease in recording throughput, which is the main disadvantage of the divided recording method. In this case, for a predetermined recording area, the allotment rate is set so that the color ink has a higher recording duty during the first pass, thereby causing a larger amount of color ink to be deposited on the recording medium as an underlayer for the black ink. Consequently, by depositing the black ink on the color ink, the inter-color bleeding can be prevented. This enables a high-grade color image to be formed by preventing a decrease in recording throughput, which has been the disadvantage of the divided recording method, and the inter-color bleeding.

Preferred variations of the embodiment of the present invention will be described below in detail with reference to the drawings.

(First Variation)

First, a first variation of the embodiment of the present invention will be described.

Figure 2A:
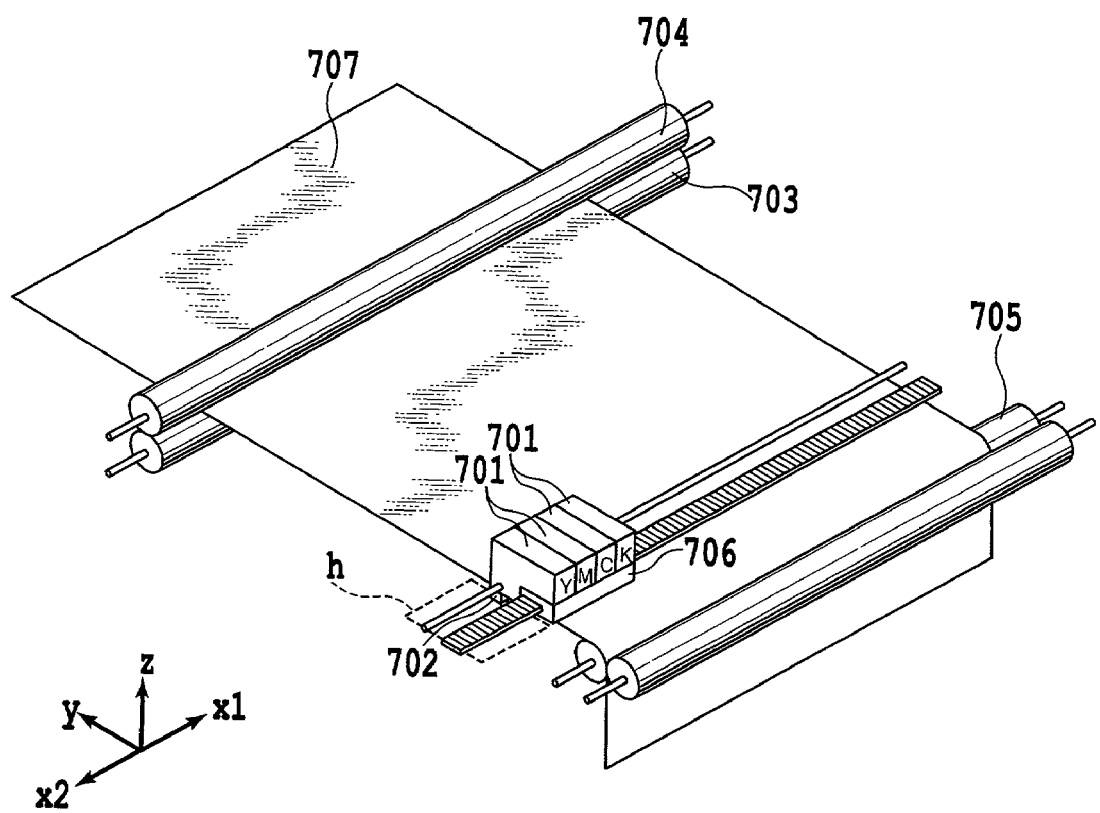
FIG. 2A is a perspective view of an ink-jet recording apparatus applied to the embodiment of the present invention.
Figure 2B:
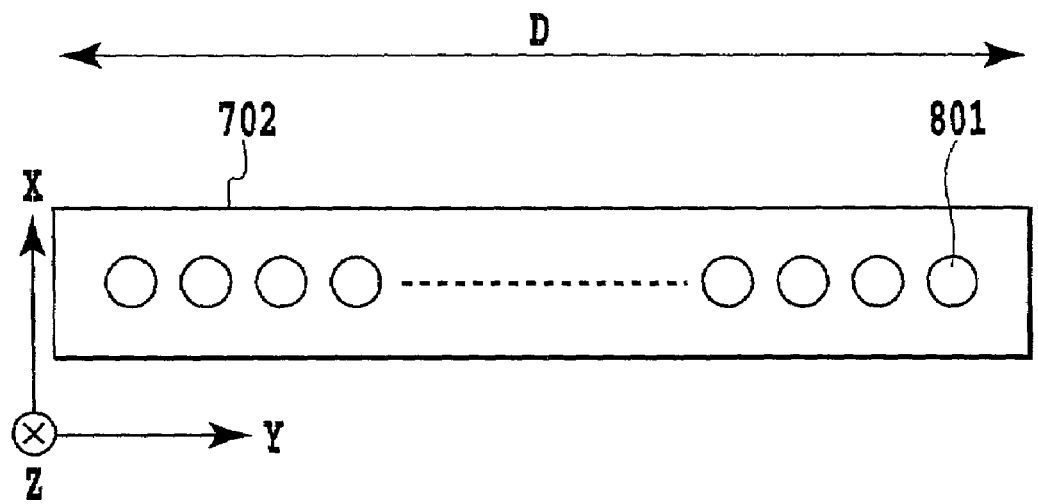
FIG. 2B is an explanatory representation showing the construction of the recording heads shown in FIG. 2A.

FIG. 2A is a perspective view of an ink-jet recording apparatus in which the ink-jet recording method of the present invention has been implemented. In this figure, reference numeral 702 denotes ink cartridges. These ink cartridges are each composed of an ink tank that stores one of the four types of color ink, that is, black, cyan, magenta, and yellow ink, as well as a recording head 702. The recording head 702 has a large number of ink ejecting nozzles linearly arranged as shown in FIG. 2B. The nozzles formed in the recording head 702 each have a thermal-energy generating element installed therein for converting electric energy into thermal energy. Thus, the thermal energy generated by the thermal-energy generating element generates bubbles in the ink so that energy generated by the bubbles causes the ink to be ejected from the ink nozzles.

Further, in FIG. 2A, reference numeral 703 denotes a sheet feeding roller adapted to sandwich a recording medium 707 between itself and an auxiliary roller 704 disposed opposite it, while rotating in the direction of an arrow in the figure to transport the recording medium 707 in the y direction in the figure as required. Furthermore, reference numeral 705 denotes a sheet feeding roller that feeds the recording medium and serves to hold the recording medium 707 in place similarly to the rollers 703 and 704.

Reference numeral 706 denotes a carriage that supports the four ink cartridges and moves them during recording. While the recording operation is not performed or the multihead is being recovered, the carriage stands by at a home position h, shown in the figure by a broken line. In this case, the four ink-jet cartridges mounted on the carriage 706 are arranged to lay the different types of ink on each other in the order of the black, cyan, magenta, and yellow ink. Thus, when the carriage 706 is moved in the x1 direction (forward direction) in the figure for scanning, the black ink is first caused to impact the recording medium and the color ink is then caused to impact the medium in the order of the cyan, magenta, and yellow ink.

Accordingly, if the carriage 706 is reversely moved in the x2 direction (backward direction) in the figure for scanning, the color ink is first caused to impact the recording medium in the order of the cyan, magenta, and yellow ink, and the black ink is then caused to impact the recording medium. Further, in this embodiment, the cyan, magenta, and yellow ink, housed in the respective color ink cartridges, permeates through the recording medium at high speed so as to prevent bleeding at the boundary between different colors while a color image is being formed.

On the other hand, the black ink, housed in the black ink cartridge, permeates through the recording medium at a lower speed than the three types of color ink so as to obtain a dense and high-grade black image with ink bleeding suppressed.

Further, in this variation, about 4 pl of ink droplets are ejected from each of the ink nozzles formed in the recording head 703.

The composition of the ink used in this variation is shown below.

| Cyan ink (C) | |
|---|---|
| C. I. Direct blue 199: | 3 pts. wt |
| Diethylene glycol: | 15 pts. wt. |
| Isopropyl alcohol: | 2 pts. wt. |
| Pentandiole: | 10 pts. wt. |
| 2 pyrolidone: | 10 pts. wt. |
| Acetynole ET (Kawaken Fine Chemical): | 1 pts. wt. |
| Magnesium nitrate: | 2 pts. wt. |
| Water: | remaining pts. wt. |
| Magenta ink (M) | |
| C. I. Acid red 289: | 3 pts. wt. |
| Diethylene glycol: | 15 pts. wt. |
| Isopropyl alcohol: | 2 pts. wt. |
| Urea: | 5 pts. wt. |
| Acetynole ET (Kawaken Fine Chemical): | 1 pts. wt. |
| Water: | remaining pts. wt. |
| Yellow ink (Y) | |
| C. I. Direct Yellow: | 3 pts. wt. |
| Diethylene glycol: | 15 pts. wt. |
| Isopropyl alcohol: | 2 pts. wt. |
| Urea: | 5 pts. wt. |
| Acetynole ET (Kawaken Fine Chemical): | 1 pts. wt. |
| Water: | remaining pts. wt. |
| Black ink (Bk) | |
| Anionic carbon black: | 3 pts. wt. |
| Diethylene glycol: | 15 pts. wt. |
| Glycerin: | 10 pts. wt. |
| Acetynole ET (Kawaken Fine Chemical): | 0.1 pts. wt. |
| Water: | remaining pts. wt. |

As shown above, the CMY ink can permeate through the recording medium at high speed because it contains a larger amount of acetynole EH, a nonionic surface active agent, than the black ink. The additives include other surface active agents and alcohol.

In this variation, the cyan ink is reactive. The magnesium nitrate in the cyan ink reacts with the anionic carbon black and thus causes the black ink to solidify or cohere to hinder it from bleeding. In this regard, the composition of the ink is not limited to the one listed above, but similar effects are obtained by using other ink components as long as they have similar nature.

Figure 3:
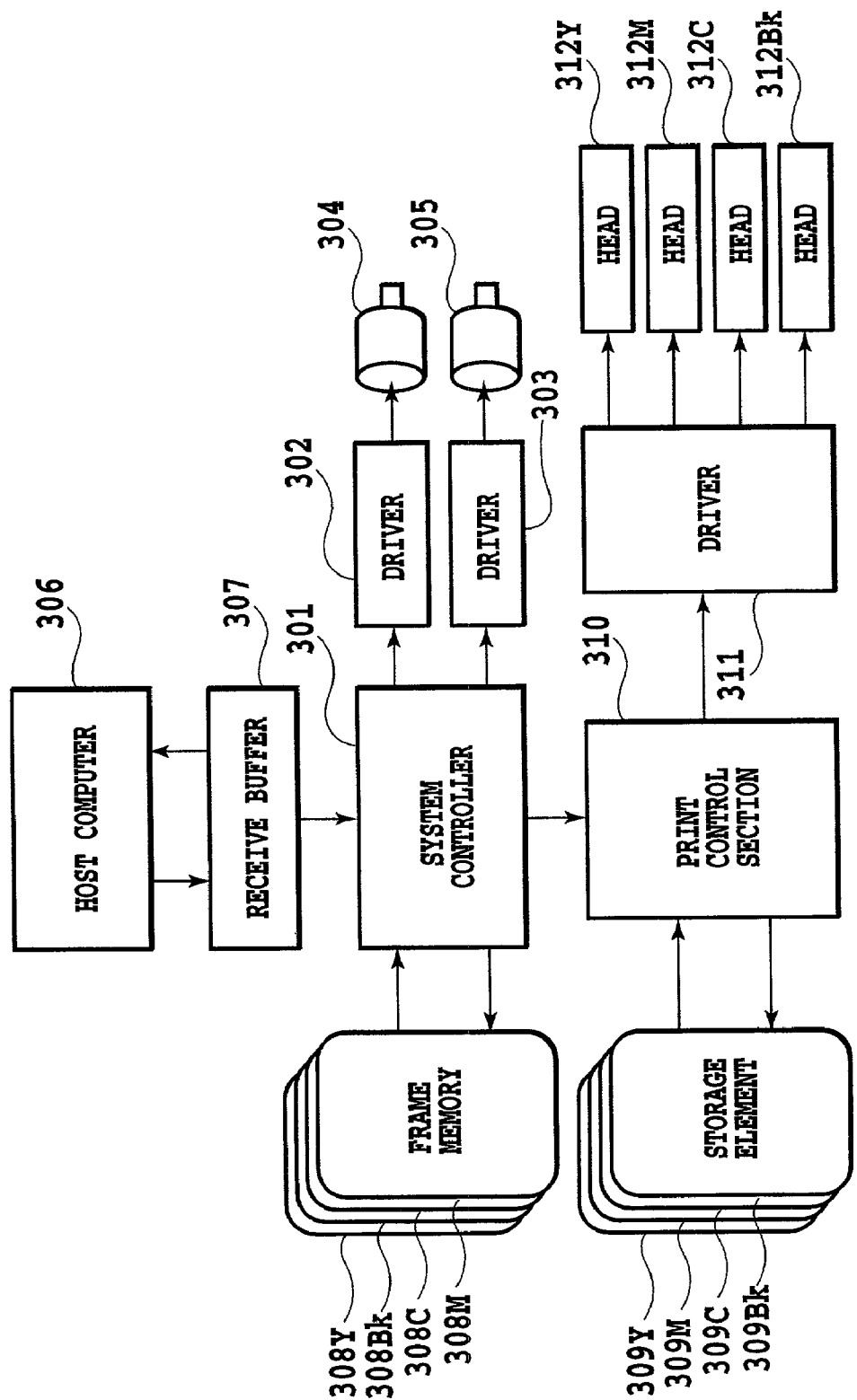
FIG. 3 is a block diagram showing the construction of a control system of the ink-jet recording apparatus applied to the embodiment of the present invention.
Figure 5D:
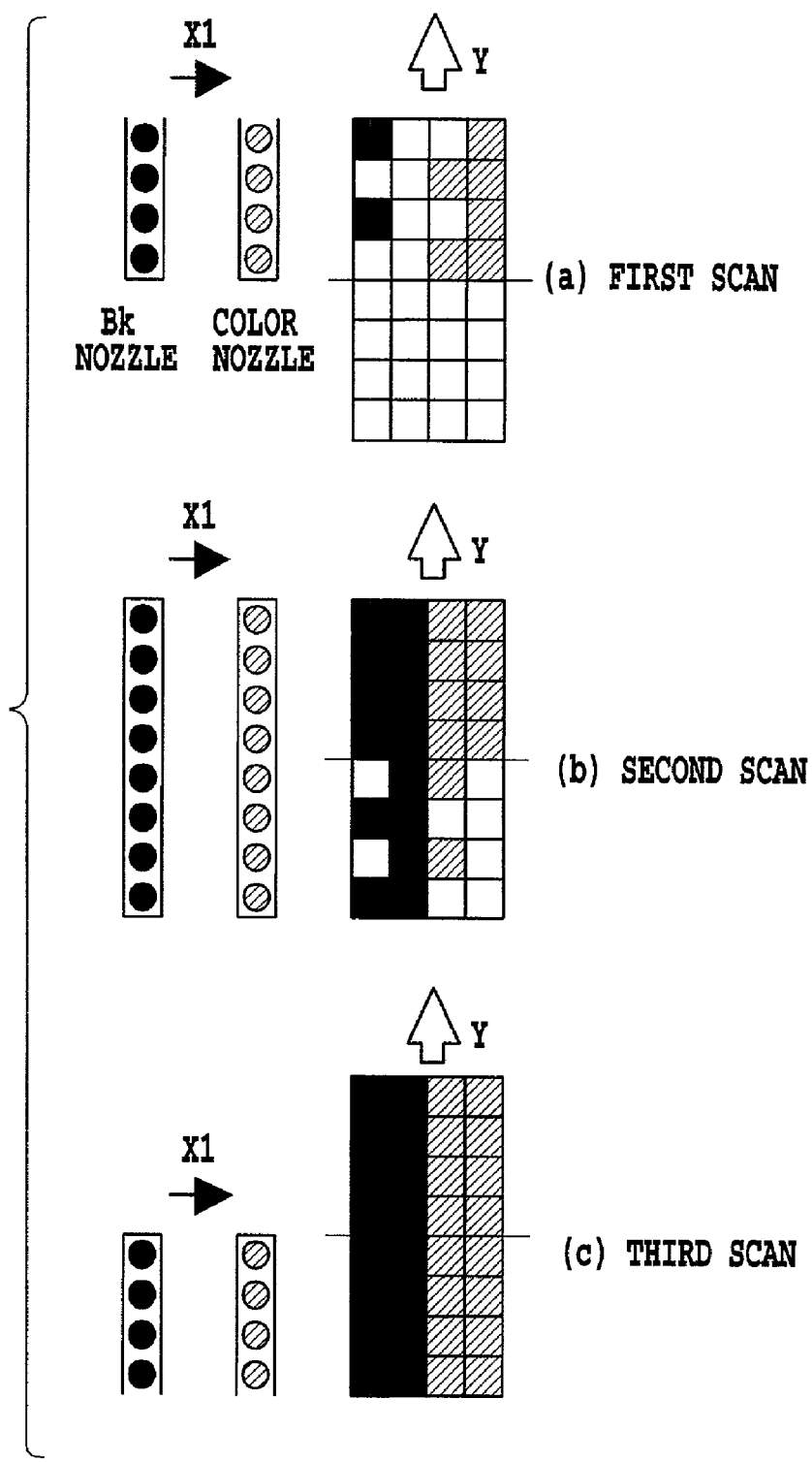

FIG. 3 is a block diagram showing the construction of a control system of the ink-jet recording apparatus. Reference numeral 301 denotes a system controller containing a microprocessor, a storage element (ROM) storing a control program and the like, a storage element having a work area and the like, the work area being used by the microprocessor to execute processes, and other components. Reference numeral 302 denotes a driver that drives a carriage motor for moving the carriage 706 in a main scanning direction, and reference numeral 303 denotes a driver that drives a sheet transporting motor for moving the recording medium in a sub-scanning direction.

Further, reference numeral 306 denotes a host computer externally connected to the ink-jet recording apparatus to create, store, and transfer record data to be supplied to the ink-jet recording apparatus and perform other operations. Reference numeral 307 denotes a receive buffer that temporarily stores data from the host computer 306 and accumulates the data until it is read out by the system controller 301. Reference numeral 308 denotes a frame memory which expands data to be recorded into image data and which has a memory size required for recording in a predetermined recording area. In this variation, the frame memory can store image data for one print sheet, but the size of the frame memory may be changed as required and is not limited to this variation.

Reference numeral 309 denotes a storage element which temporarily stores data and which has a required capacity varying depending on the number of nozzles in the recording head. Reference numeral 310 denotes a recording control section that properly controls the recording head in accordance with instructions from the system controller. The recording control section controls ejection speed, the number of data recorded, and the like. Reference numeral 311 denotes a driver which drives the recording heads 312Y, 312M, 312C, and 312Bk and which is controlled in accordance with signals from the recording control section 310.

Now, the operation of this apparatus will be described on the basis of the above construction.

FIGS. 1A to 1D are explanatory representations schematically showing a recording operation according to this variation.

In this variation, a 2-pass recording method is employed which forms each recorded image area by allowing the recording heads to perform two scanning operations, and the recording operation is performed only in the scan direction in which the color ink is caused to impact the recording medium before the black ink.

FIG. 1A shows an example of image data recorded in this variation, wherein black (Bk) data and color data are adjacent to each other in a 4×8 pixel recorded area. The type of the color data is not specified here, but any of cyan, magenta, and yellow is adaptable to this variation. FIGS. 1B and 1C show division patterns used to divide the image data so that the image is completed by a 2-pass recording operation (that is, patterns with which the image data corresponding to the predetermined area is allotted to each of the plurality of passes). The division patterns are individually provided for black and for another color. These division patterns are each composed of a matrix of 4×8 pixels, in which lower 4×4 pixels correspond to an area in which data is recorded during the first pass, whereas upper 4×4 pixels correspond to an area in which data is recorded during the second pass. Image data to be recorded during each pass can be determined by masking the image data with these division patterns. The size of the matrix of each division pattern is not limited to this example, but the matrix may be composed of another number of pixels. That is, the size of the matrix is not limited to the present invention. In this embodiment, during the first pass, the original black Bk data is allotted using a division pattern with an allotment rate of 75% so as to have a recording duty of 75%, while the color data is allotted using a division pattern with an allotment rate of 25% so as to have a recording duty of 25%. During the second pass, the original black Bk data is allotted using a division pattern with an allotment rate of 25% so as to have a recording duty of 25%, while the color data is allotted using a division pattern with an allotment rate of 75% so as to have a recording duty of 75%. That is, the allotment rates for the division patterns for black Bk and for another color are complementary in each of the upper and lower areas so that the image areas for black Bk and another color are completed by scanning the same recording area twice for recording in accordance with the division patterns. In general, the conventional divided recording method uses a 100/N % recording duty where N is the number of recording scans executed in one pass area (N>1). If N=2 as in this variation, then 100/2=50% duty. Consequently, in this variation, by setting this 50% duty to be a reference value, duties higher or lower than the reference recording duty can be set for each pass.

Now, a recording step used to record the image data shown in FIG. 1A using the above division patterns will be shown in FIG. 1D (a) to (c).

First, during the first scan, a portion of each of the black Bk nozzle and color nozzle which corresponds to lower four dots is used to apply, for recording, the first pass areas of the division patterns shown in FIGS. 1B and 1C to the upper 4×4 image area of the image data shown in FIG. 1A (recording step (a)). This scan causes 75% of the image area to be allotted to the black Bk image data shown in FIG. 1A to record the black pixels with a 75% duty, while 25% of the image area to be allotted to the color image data to record the color pixels with a 25% duty.

Then, during the second scan, each nozzle is shifted downward a distance corresponding to four dots relative to the recording medium so that the eight nozzles can be used for recording. In this regard, the relative movement between the nozzles and the recording medium is actually executed by moving the recording medium in the sub-scanning direction (y direction) relative to each nozzle. Further, the 4×8 pixels of the division patterns shown in FIGS. 1B and 1C are applied to the entire area of the image data shown in FIG. 1A for recording (recording step (b)). This second scan completes recording the upper 4×4 pixels of the entire image area and corresponds to the first pass for the lower 4×4 pixel area. Thus, as in the case with the first scan, 75% of the image area is allotted to the black Bk image data shown in FIG. 1A to record the black pixels with a 75% duty, while 25% of the image area is allotted to the color image data to record the color pixels with a 25% duty. Then, during the third pass, the second pass areas of the division patterns shown in FIGS. 1B and 1C are applied to the lower image data in FIG. 1A to record the data on the pixels on which no data has been recorded during the first pass. Thus, all the image data shown in FIG. 1A is recorded.

By thus setting the division patterns, recording 75% of the black data and 25% of the color data during the first pass, and then recording the remaining data during the second pass to complete the image, a difference in recording duty between the black data and color data recorded during these passes is increased. This reduces the percentage of the black and color ink caused to impact the recording medium at adjacent positions during these passes. Therefore, the bleeding between black and another color can be prevented.

In this variation, the allotment rates for the first pass are set so that the allotment rate for black Bk is set to be higher than the reference rate of 50% (in this case, 75%), while the allotment rate for another color is set to be lower than the reference rate of 50% (in this case, 25%). Further, the allotment rates for the second pass are set so that the allotment rate for black Bk is set to be lower than the reference rate (25%), while the allotment rate for another color is set to be higher than the reference rate (75%). However, on the contrary, the allotment rates for the first pass may be set so that the allotment rate for black Bk is set to be lower than the reference rate, while the allotment rate for another color is set to be higher than the reference rate, and the allotment rates for the second pass may be set so that the allotment rate for black Bk is set to be higher than the reference rate, while the allotment rate for another color is set to be lower than the reference rate.

Furthermore, even if the ratio of the divisions within each pattern (that is, the allotment rates for the division pattern) is changed or the form of each pattern is changed, a bleeding prevention effect similar to that described above is obtained by setting the allotment rates for the division patterns used during the same pass so that black Bk and another color undergo different allotment rates and thus different recording duties during the same pass. Additionally, the recording direction may be reversed.

(Second Variation)

Now, a second variation of the embodiment of the present invention will be described with reference to FIGS. 5A to 5D.

The second variation has the construction shown in FIGS. 2 and 3 likewise with the above described first variation, but differs from the first variation in the forms of the division patterns for black Bk and another color. That is, in the first variation, for both black Bk and another color, the division pattern is divided into two portions, and one of these portions (lower portion) is used to record the first pass area, whereas the other portion (upper portion) is used to record the second pass area. On the contrary, in this variation, the division patterns shown in FIGS. 5B(a), 5B(b), 5C(a), and 5C(b) are used. For these division patterns, the allotment rate is individually set for black Bk and for another color as in the case with the division patterns in the first variation. However, the division pattern for each color is divided into a division pattern for an odd-number scan and a division pattern for an even-number scan, and for the same scan, the upper 4×4 pixels have the same pattern as the lower 4×4 pixels.

That is, in this variation, 4×4 pixels are used as a minimum unit for the matrices of the division patterns, and the 4×4 pixel pattern is repeatedly used for all the nozzles. Also in this case, the recording duties for black Bk and another color are complementary within the same scan (that is, within the same pass). That is, an image is formed by performing a recording operation in the following manner: During an odd-number scan, 25% of the original image data is allotted to black Bk, while 75% thereof is allotted to another color. On the contrary, during an even-number scan, 75% of the original image data is allotted to black Bk, while 25% thereof is allotted to another color. A recording process of forming the image data (similar to that in FIG. 1A) shown in FIG. 5A using the above division patterns will be described with reference to schematic drawings FIG. 5D (a) to (c).

First, while the recording heads are executing the first scan, the odd-number scan patterns, shown in FIGS. 5B(a) and 5C(a), are used to divide the original pattern so as to record 75% of the color data and 25% of the black Bk data. Then, during the second scan, the even-number scan division patterns, shown in FIGS. 5B(b) and 5C(b), are used to divide the original pattern so as to record 25% of the color data and 75% of the black Bk data. Likewise, during the third scan, the odd-number scan patterns, shown in FIGS. 5B(a) and 5C(a), are used again to record the data on the pixels on which no data has been recorded during the second scan to complete the image.

In this variation, black Bk and another color are each provided with the odd- and even-number division patterns, and the allotment rate is fixed for each of the division patterns used for each scan. However, for certain recording areas, the order of the allotment rates for each pass is reversed, with the order of the recording duties correspondingly reversed. That is, in the drawing, for the upper 4×4 pixels, an image is completed by recording black Bk data with a recording duty of 25% while recording another color data with a recording duty of 75% during the first pass, and recording black Bk data with a recording duty of 75% while recording another color data with a recording duty of 25% during the second pass. On the contrary, for the lower 4×4 pixels, an image is completed by recording black Bk data with a recording duty of 75% while recording another color data with a recording duty of 25% during the first pass, and recording black Bk data with a recording duty of 25% while recording another color data with a recording duty of 75% during the second pass.

As described above, the different recording processes are used depending on how the division patterns are used. However, by setting, for the same scan, the different allotment rates for black Bk and for another color so as to set, for the same scan, the different recording duties for black BK and for another color, the rate at which the black Bk color ink and the color ink contact with each other on the recording medium during the same scan can be reduced to prevent the bleeding between black Bk and another color. This variation employs the division patterns in FIGS. 5B(a), 5B(b), 5C(a), and 5C(b), but similar effects are obtained using other allotment rates and patterns as long as for the same scan, different allotment rates are used for black Bk and for another color so as to set different recording duties for black Bk and for another color.

(Third Variation)

Now, a third variation of the embodiment of the present invention will be described with reference to FIGS. 6 and 7.

The third variation is characterized in that to allow the black ink to settle in the recording medium more appropriately, at least one type of color ink is caused to impact the recording medium before or after the black ink.

Figure 6A:
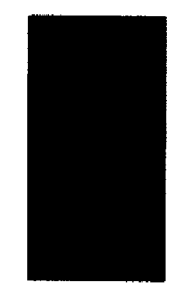
FIGS. 6A to 6E are explanatory representations showing a process of creating overlapping data according to a third embodiment of the present invention.
Figure 6B:
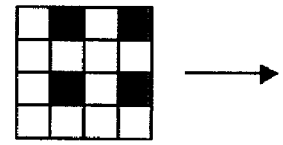
Figure 6C:
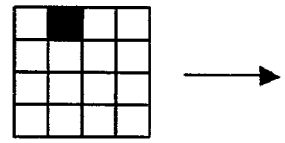

In this variation, overlapping color data is created by allowing the expansion patterns shown in FIGS. 6B and 6C to act on the black Bk data shown in FIG. 6A. The expansion pattern shown in FIG. 6B is for cyan, and the expansion pattern shown in FIG. 6C is used for both magenta and yellow. Each expansion pattern is formed of 4×4 pixels. As shown in the drawing, the cyan expansion pattern is set to cause 75% of the original black data to be thinned to the cyan data to create record data with a 25% duty, whereas the magenta or yellow expansion pattern is set to cause 93.7% of the original black data to be thinned to magenta or yellow data to create record data with a 6.3% duty. If the original image data is composed of more than 4×4 pixels, the above expansion patterns are repeated in the vertical and horizontal directions.

Figure 6D:
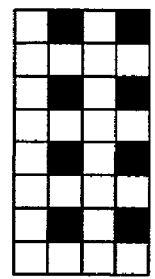
Figure 6E:
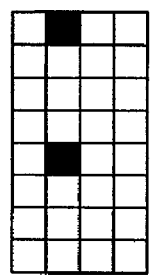
Figure 7A:
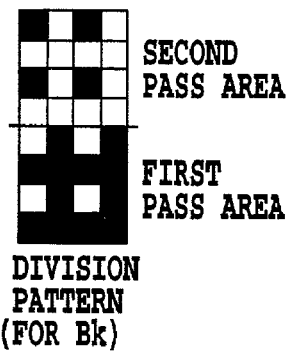
FIGS. 7A to 7F are explanatory representations showing a recording process according to a third embodiment of the present invention.
Figure 7B:
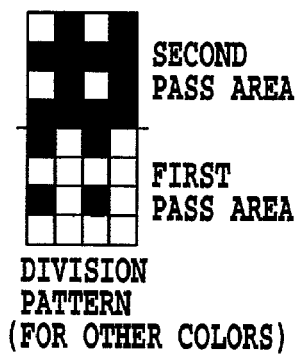
Figure 7C:
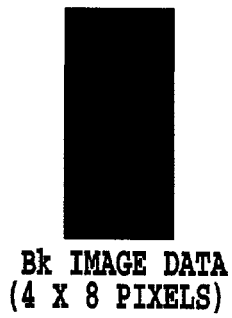
Figure 7D:
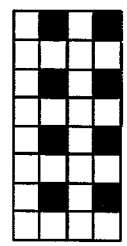
Figure 7E:
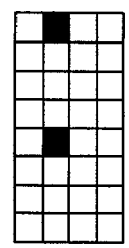
Figure 7F:
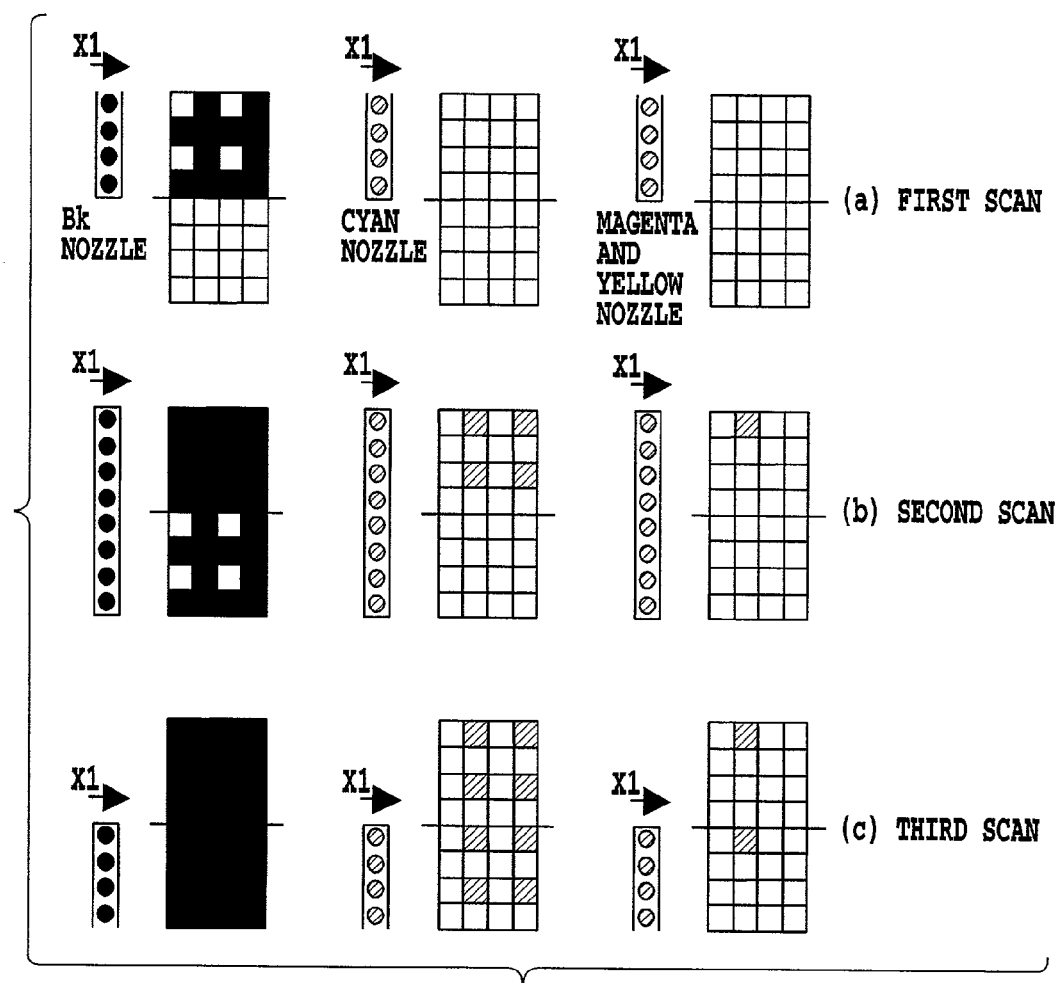

If solid black Bk image data of 4×8 pixels such as the one shown in FIG. 6A, then the overlapping data expansion patterns shown in FIGS. 6D and 6E are used to obtain the data shown in FIGS. 7D and 7E as overlapping color data.

A process of actually recording the black data shown in FIG. 6A using the overlapping data shown in FIGS. 6D and 6E will be described below with reference to FIGS. 7A to 7F. The recording method and division pattern used in this variation are shown in FIGS. 7A and 7B and are the same as those shown in the first variation. The recording direction in this variation is set so that the color ink is caused to impact the recording medium before the black ink. Specifically, the yellow, magenta, cyan, and black Bk ink is caused to impact the recording medium in this order.

First, during the first scan (recording step (a)), the upper 4×4 pixel area of the 4×8 pixels is recorded. However, the first scan does not involve any overlapping color data due to the allotment based on the color division pattern, so that the color ink is not ejected. On the other hand, 75% of the black Bk image data is allotted to the pixel area based on the division pattern to create 75% record data, which is then recorded. During the second scan, the recording nozzles are moved downward a distance corresponding to four nozzles relative to the recording medium to set the 4×8 pixels to be a recording area. In the upper 4×4 pixel recording area, the overlapping color ink is caused to impact the recording medium, that is, 6.3% of the yellow data, 6.3% of the magenta data, and 25% of the cyan data are provided in this order. Further, for the lower 4×4 pixels of the 4×8 pixel recording area, a recording process is executed which is similar to the one executed for the upper image area during the first scan. That is, in the lower image area, no color ink is caused to impact the recording medium, but only the black Bk ink is caused to impact the recording medium in accordance with record data with a 75% duty. Finally, during the third scan, for the lower 4×4 pixels of the recording area, a recording process similar to the one executed for the upper 4×4 pixels during the second scan is executed to complete recording the color image data and the black Bk image data.

As described above, in this third variation, the color ink is caused to impact the black image area, and then the black Bk ink is caused to impact the same area. Accordingly, the black Bk ink can permeate through the recording medium at a higher speed and can settle therein more appropriately. This prevents the bleeding between black Bk ink and color ink caused to impact a color recording area adjacent to the black Bk recording area.

The cyan ink, reactive ink, is provided as an underlayer in order to more appropriately settle the black Bk ink in the recording medium. However, a black image formed using the cyan ink will appears slightly closer to cyan than one formed by causing the black Bk ink to directly impact the recording medium without using any underlayer. Thus, in this embodiment, magenta and yellow are caused to impact part of the image area to form process black, onto which the black Bk ink is ejected. However, if the amount of ink caused to impact the recording medium is larger than amount of ink that can be absorbed by the recording medium, the ink may overflow. Accordingly, the amount of color ink, which constitutes the underlayer, is adjusted so as to prevent the ink overflow. Consequently, the underlayer contains not only process black dots but also cyan-only dots. However, the underlayer containing process black hinders the black image from appearing slightly close to cyan compared to the cyan-only underlayer, thus producing better recording results.

(Fourth Variation)

Now, a fourth variation of the embodiment of the present invention will be described with reference to FIGS. 8A to 8F.

Also in this variation, division pattern similar to those used in the above described third variation are used. The overlapping data shown in FIGS. 8D and 8E are obtained by adjusting the expansion patterns used to create overlapping data. In this case, 4×8 solid image data is applied as in the case with the third variation.

When this color data is recorded, then contrary to the third variation, the overlapping of the color ink is always executed during the first pass, and then the black Bk ink is caused to impact the recording medium. That is, the black Bk ink can be caused to impact any area of the recording medium using the color ink as an underlayer and can thus permeate through the recording medium at a higher speed. Consequently, the bleeding between the black Bk image area and the color image area is more effectively prevented than in the third variation.

Figure 8A:
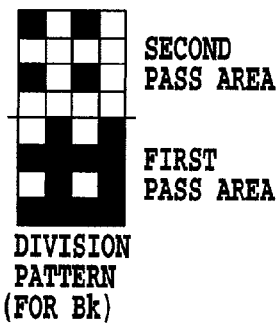
FIGS. 8A to 8F are explanatory representations showing a recording process according to a fourth embodiment of the present invention.
Figure 8B:
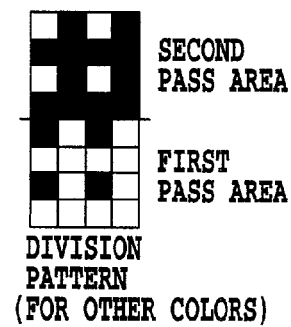
Figure 8C:
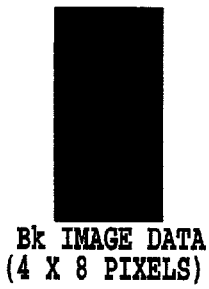
Figure 8D:
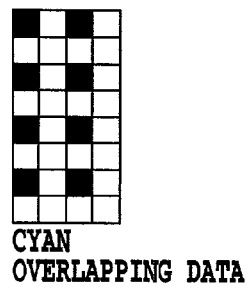
Figure 8E:
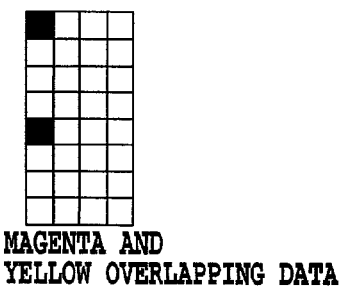
Figure 8F:
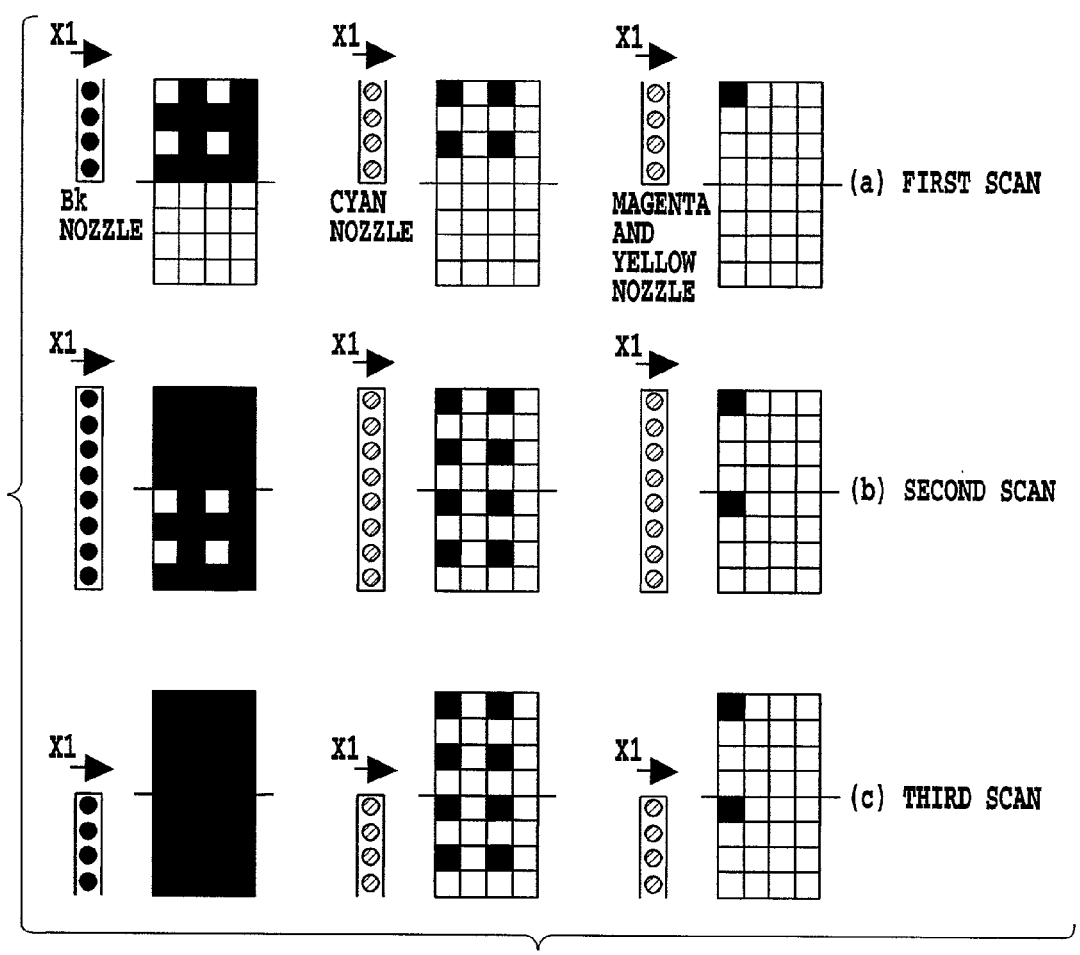

In the fourth variation, the color data shown in FIGS. 8D and 8E are created by changing the expansion patterns used to create the overlapping data, but a similar recording condition, that is, the condition under which the black ink is provided using the color ink as an underlayer, can also be established by changing the division patterns shown in FIGS. 8A and 8B.

Further, in this variation, the recording operation is performed only in the direction in which the color recording head passes over the recording medium before the black recording head so that the color ink is caused to impact the recording medium using the black ink as an underlayer. On the contrary, if the recording operation is performed during a scan in the opposite direction, the overlapping color ink is caused to impact the recording medium after the black ink. However, it has been found that also in this case, the black ink can settle in the recording medium more appropriately. However, the settlability of the black ink is higher when the color ink is used as an underlayer for the black ink, so that it is desirable to perform the recording operation only in the direction in which the color ink is ejected before the black ink.

Further, in this variation, the three colors, that is, cyan, magenta, and yellow are used for overlapping color ink, but effects similar to those in the above described variation are obtained by using only one of these types of ink as an underlayer.

Furthermore, the thinning out rates for the division patterns are set so that cyan has a recording duty of 25%, while yellow and magenta have a recording duty of about 6.3%. However, set values larger or smaller than the above values may be used without any trouble as long as the thinning rates for the expansion patterns are set so as to prevent the amount of ink ejected from exceeding the maximum amount of ink absorbed by the recording medium.

(Fifth Variation)

Next, a fifth variation of the embodiment of the present invention will be described with reference to FIGS. 9 and 10.

Figures 9A, 9B, 9C:
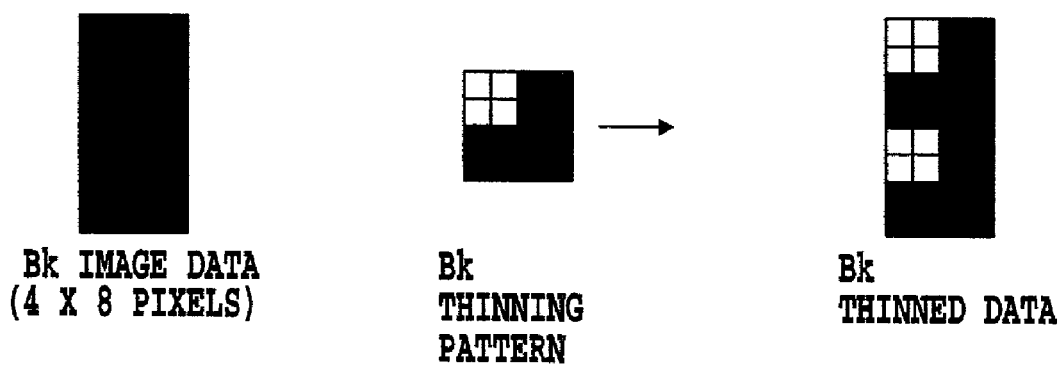
FIGS. 9A to 9C are explanatory representations showing a process of thinning Bk image data according to a fifth embodiment of the present invention.
Figure 10A:
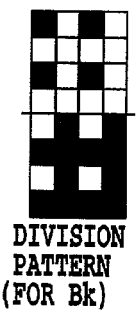
FIGS. 10A to 10F are explanatory representations showing a recording process according to a fifth embodiment of the present invention.
Figure 10B:
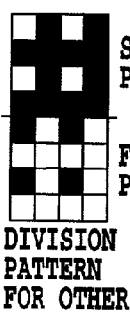
Figure 10C:
Figure 10D:
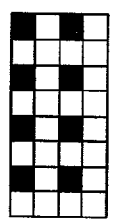
Figure 10E:
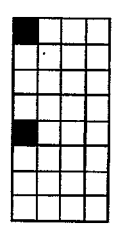
Figure 10F:
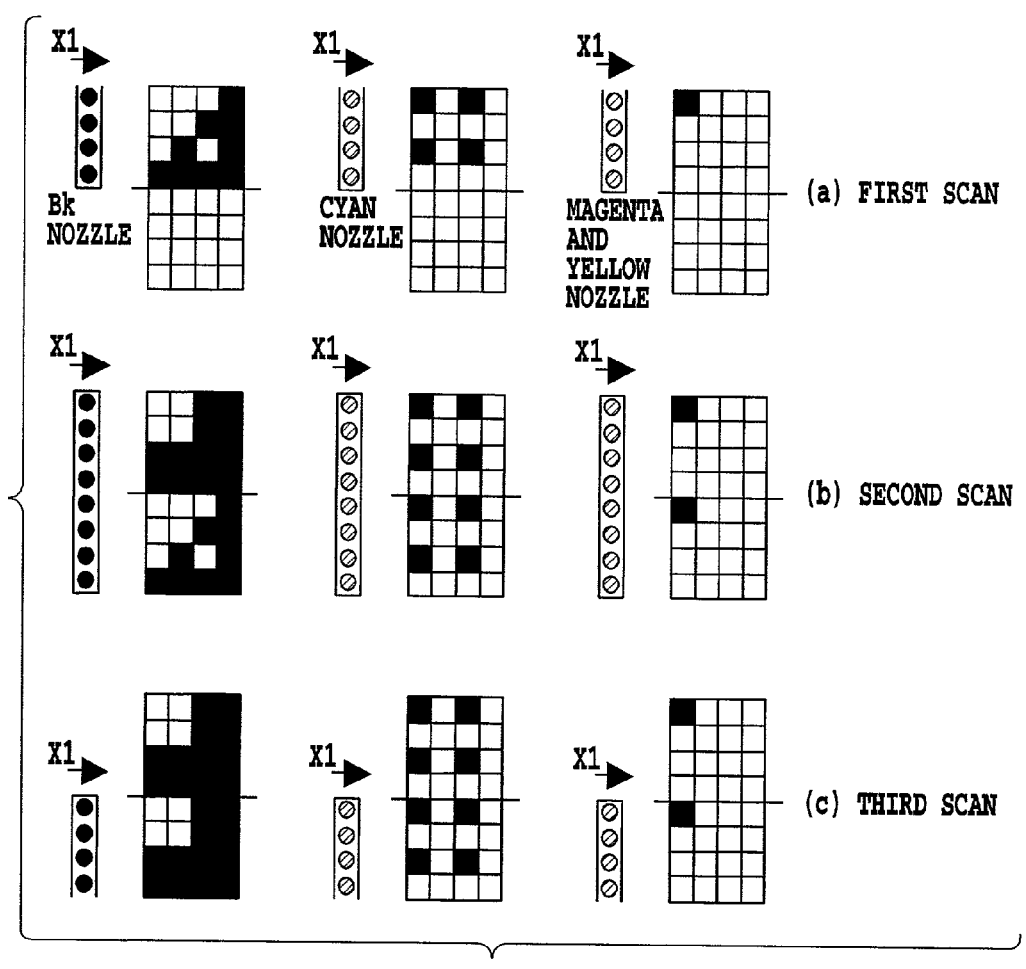

It is assumed that the 4×8 solid image data shown in FIG. 9A is input as Bk image data as in the fourth variation. In this case, in this fifth variation, the thinning pattern shown in FIG. 9B is used to thin the black Bk image data so that it has a recording duty of 75%, thereby obtaining the thinned data shown in FIG. 9C. This thinned data is recorded using the black Bk division pattern as in the case with the fourth embodiment. FIGS. 10A to 10F shows this recording process.

In this manner, in the fifth variation, 25% of the black Bk image data is thinned in advance so that the black Bk image data has a recording density of 75%, thereby preventing the overflow of the ink on the recording medium associated with the placement of the color ink on the black Bk ink. Further, the cyan, magenta, and yellow ink is caused to impact the pixels from which the black Bk data has been thinned so that these ink types are combined together form a black Bk image. This prevents a possible void in the recording medium caused by the thinning of the black Bk ink and a decrease in the density of black Bk.

In this variation, the thinning rate for the black data is set at 25%, but an optimum bleeding prevention effect is obtained by adjusting this thinning rate and the thinning rates for the overlapping expansion patterns on the basis of the degree of the bleeding between the color image areas and the absorption characteristics of the recording medium. Further, a black Bk image is formed using cyan, magenta, and yellow, but since three ink dots are provided for one pixel, the black data is preferably thinned over a relatively wide area such as one composed of 2×2 pixels as shown in FIG. 9B.

Furthermore, in both the third and fourth variations, the cyan ink is reactive, so that when it contacts with the black Bk ink, the latter solidifies. With such a reactive ink, when the overlapping expansion patterns is set such that the magenta and yellow ink has a recording duty of 6.3%, while the cyan ink has a relatively high recording duty of 25%, the solidification performance of the reactive ink can be effectively used to improve the bleeding prevention effect.

Moreover, ideally, not only the cyan ink but also the magenta and yellow ink are reactive. If all the three ink types are reactive, uniform thinning out rates can be used for the overlapping expansion patterns for these colors. Furthermore, it is unnecessary that one of the three colors has a biased recording ratio, so that the black image is not affected by the hue of the underlayer. That is, bleeding is prevented by maximizing the performance of the reactive ink while minimizing the variation of the hue of the color ink when these ink types are used to form a black image. In this regard, only two of the three color ink types may be reactive, and also in this case, a good bleeding prevention effect is obtained.

(Sixth Variation)

Now, a sixth variation of the embodiment of the present invention will be described with reference to FIGS. 11A to 11F.

In FIGS. 11A to 11F, the applied black data, color data, overlapping color data are similar to those in the above described fifth variation, but the division patters are different from those in the fifth variation. That is, in the fifth variation, for each recording area, a division pattern with a lower allotment rate is set for the color ink so that this ink has a lower recording duty during the first pass, while a division pattern with a higher allotment rate is set for the black ink so that this ink has a higher recording duty during the first pass. However, in this sixth variation, a division pattern with a higher allotment rate is set for the color ink so that this ink has a higher recording duty during the first pass, while a division pattern with a lower allotment rate is set for the black ink so that this ink has a lower recording duty during the first pass. Further, in this sixth variation, the recording operation is performed by causing the carriage to carry out scans in both forward and backward directions (bidirectional recording).

Figure 11F:
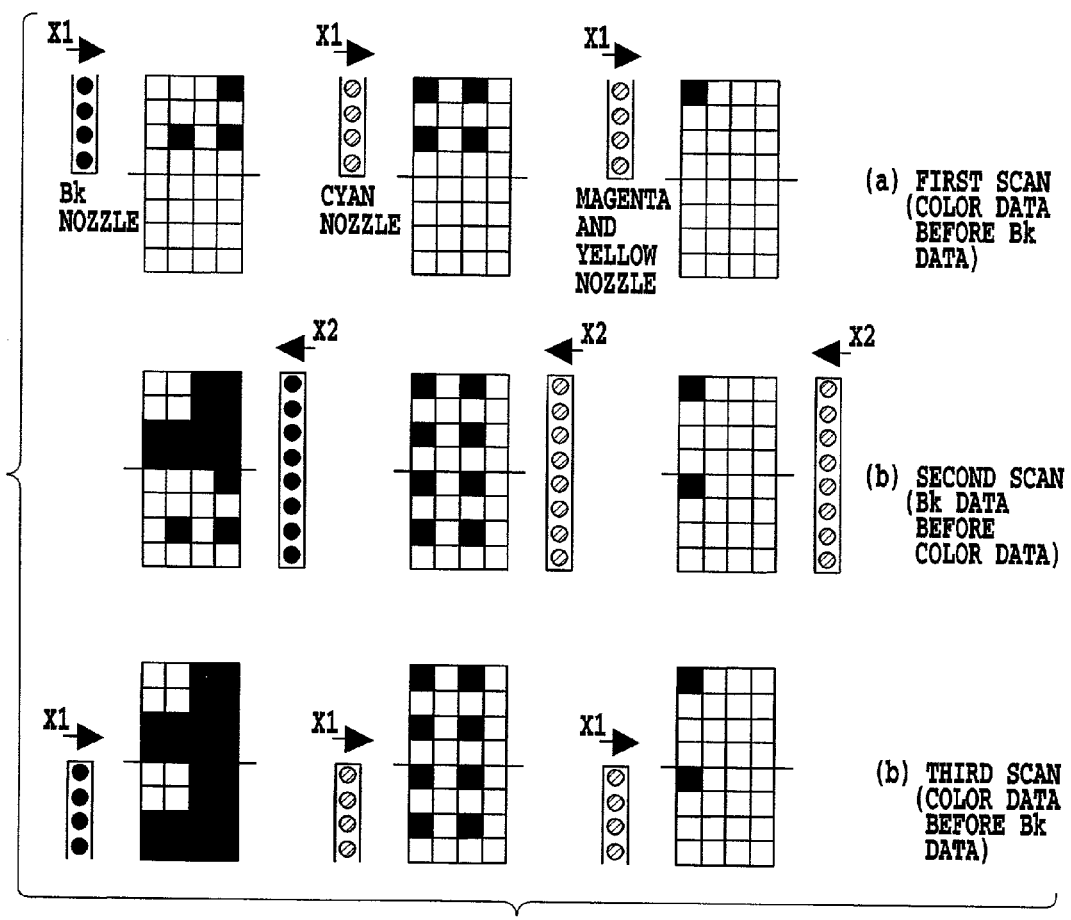

Thus, in the recording process shown in (a) and (b) in FIG. 11F and in which the color ink is ejected before the black ink, the overlapping color ink acts as an underlayer for the black ink, so that during the second pass, in which the scan direction is reversed, the black ink settles in the recording medium appropriately through the black data is recorded with a high recording duty of 75%. By thus setting a division pattern with a higher allotment rate for the color ink so that this ink always has a higher recording duty during the first pass and also setting the overlapping color ink to be ejected during this pass, the bleeding between black and another color without sacrificing recording throughput because of the bidirectional recording.

(Seventh Variation)

Now, a seventh variation of the embodiment of the present invention will be described with reference to FIGS. 12A to 12F.

Figure 12C:
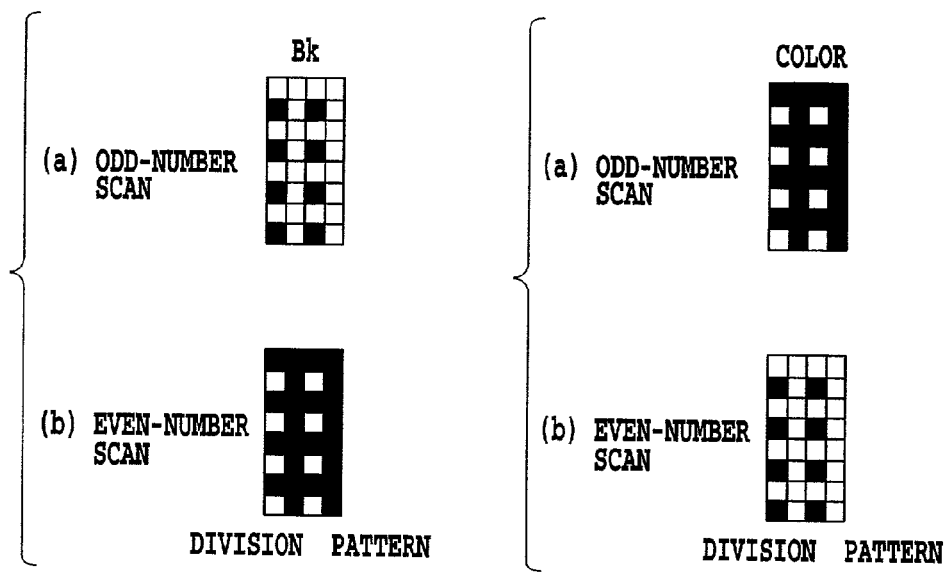
Figure 12C:
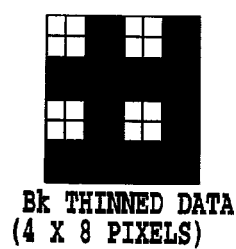
Figure 12D:
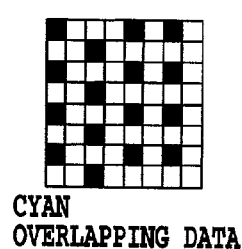
Figure 12E:
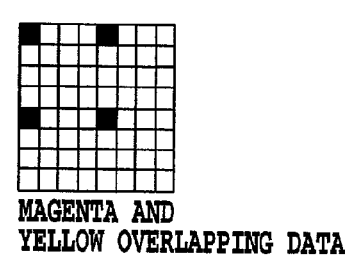

For both black Bk and other colors, the division patterns used for this variation are switched between an even-number scan and an odd-number scan, similarly to those employed in the above described second embodiment. Further, if data is recorded on 8×8 pixels to form a black Bk image, then the corresponding black Bk data is 75% thinned data obtained by thinning 25% of the original image data using a thinning pattern as shown in FIG. 12C, and the corresponding overlapping color data is as shown in FIGS. 12D and 12E.

Figure 12F:
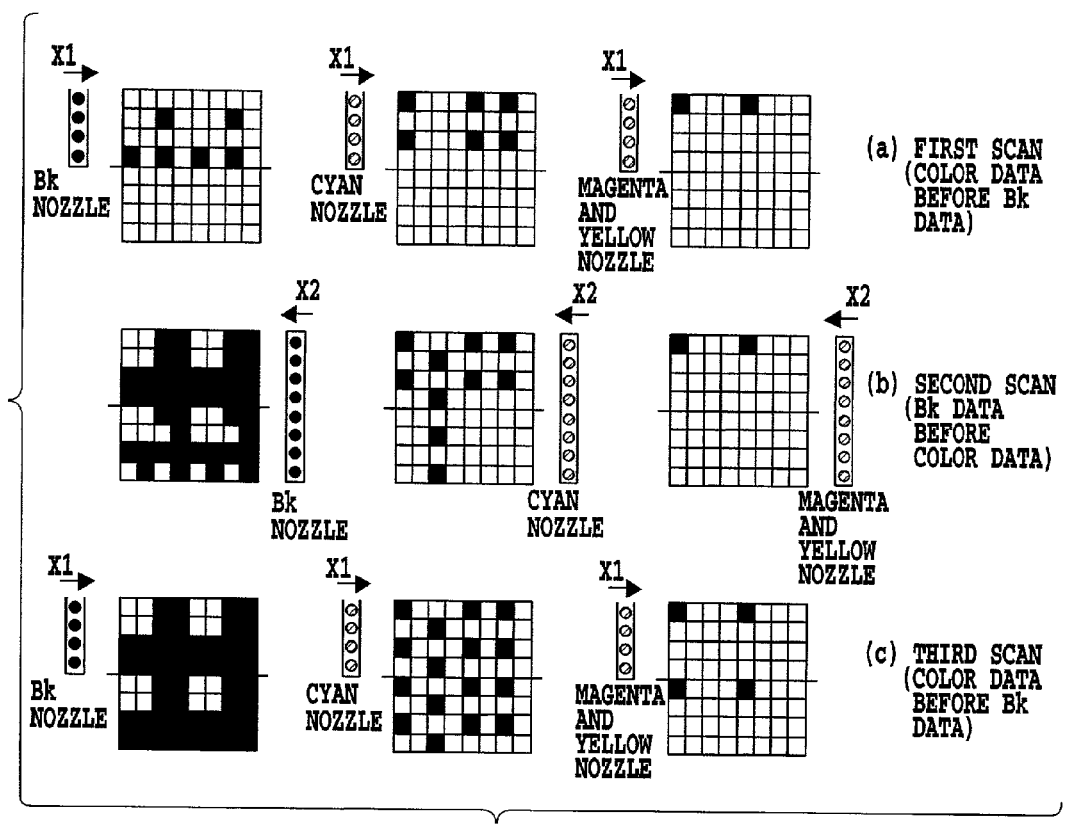

In this case, during the first scan recording process shown in (a) in FIG. 12F, data is recorded on the upper 8×4 pixels of the 8×8 pixel area using the lower four nozzles of the recording head. First, the odd-number scan division patterns are used to record 100% of the overlapping data in the order of yellow, magenta and then record 75% of the overlapping cyan data. Then, 75% of the black Bk data is recorded.

Next, during the second scan shown in FIG. 12F and executed in the direction opposite to that of the first scan, the even-number division patterns shown in part (b) of FIGS. 12A and 12B are used. Thus, for the upper 8×4 pixels of the recording area, the data is recorded on those pixels which have not been provided with ink during the first scan, and for the lower 8×4 pixels of the recording area, 75% of the black Bk data and 75% of the overlapping cyan data are caused to impact the corresponding area, with no magenta or yellow data ejected. During the third scan, the same recording direction as that in the first scan is used, and the odd-number scan division patterns shown in part (a) of FIGS. 12A and 12B are used.

This scan causes the data to be recorded on those of the lower 8×4 pixels of the recording area on which no data has been recorded during the second scan, thereby completing an image.

As described above, an image is completed using the division patterns and overlapping color data so that in the direction in which the color ink is ejected before the black Bk ink, the color data always has a higher recording duty, while the black Bk data always has a lower recording duty. On the contrary, in the direction in which the black Bk ink is ejected before the color data, the color data has a lower recording duty, while the black Bk data has a higher recording duty.

Further, also for the overlapping color data, in the direction in which the color ink is ejected before the black Bk ink, 75% of the cyan data and 100% of the magenta and yellow data are always recorded, whereas in the direction in which the black Bk ink is ejected before the color ink, the remaining 25% of the cyan data is recorded. Thus, the overlapping color ink is deposited on the recording medium in both the forward and backward scanning directions, thereby reliably preventing the bleeding between the black Bk image area and the color image area.

This variation employs the division patterns and overlapping color data shown in FIGS. 12A to 12F, but the timings with which the overlapping data and the original image data are recorded may be changed by changing the shapes of the division patterns and the pattern shapes of the overlapping color data. Thus, the ejection of the ink can be optimized on the basis of the recording media and ink set used, thereby maximizing the effect of prevention of the bleeding between the color image areas.

(Other Variations)

In the above described variations, in setting, for the same pass, different allotment rates for the black image data and for the color image data, the allotment rates for the division patterns used for each pass may be set at arbitrary values, or plural types of mask patterns having different allotment rates may be provided so that one of them can be properly selected. Alternatively, the allotment rates for the black and color image data may be determined for each pass in advance so that the black and color image data have different allotment rates during the same pass. For example, the allotment rates for the black and color image data may be set at A and B% for the first pass, at C and D% for the second pass, and at E and F% for the third pass, respectively.

The present invention is not limited to the aspect in which the ink-jet recording apparatus executes the image data allotting process, but a host computer or the like which is connected to the ink-jet recording apparatus may execute this process.

(Other Embodiments)

The present invention may be applied to a system consisting of a plurality of devices (such as a host computer, an interface device, a reader and a printer) or to single device (such as a copying machine and a facsimile).

The present invention also includes a configuration in which a computer in an apparatus or system, which is connected with a variety of devices so as to realize functions of the foregoing examples shown in FIGS. 9 to 11 and FIGS. 15 to 21, is loaded with a program code of software and in which these devices are operated according to the program stored in the computer (CPU or MPU).

In this case, the software program code itself realizes the functions of these examples. The program code and a means for loading the program code to the computer, such as a storage medium containing a program code, constitute the present invention.

The storage media for storing the program code include floppy disk, hard disk, optical disk, magnetooptical disk, CD-ROM, magnetic tape, nonvolatile memory card and ROM.

The program code is included in the present invention not only when the functions of the aforementioned examples are realized by executing the program code loaded into the computer, but also when these functions are realized by the program code in cooperation with an OS (operating system) or application software running on the computer.

It is needless to say that the present invention further includes a configuration in which the program code is stored in a memory mounted on a computer's function extension board or a function extension unit connected to the computer and the CPU in the function extension board or unit executes a part or all of the actual processing according to the instructions of the program code to realize the functions of the preceding examples.

As described above, according to the present invention, the black data and the color data have different allotment rates during the same pass so that the black ink and the color ink have different recording duties in a predetermined recording area during the same pass. Accordingly, the bleeding between the color image area and the black image area can be prevented to provide high-grade images.

Further, when a black image is to be formed, not only the black ink but also the color ink are ejected to allow the black ink to settle in the recording medium more appropriately. Furthermore, when the color ink is reactive, the settlability of the black ink can be further improved.

The settlability of the black ink can be further improved by causing the color ink to impact the recording medium to form an underlayer before causing the black ink to impact this underlayer.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A color ink-jet recording apparatus using a black recording head that ejects black ink on the basis of black image data and a color recording head that ejects color ink on the basis of color image data, the color ink permeating through a recording medium at a higher speed than the black ink, said apparatus comprising:

controlling means for controlling scanning of the black recording head and of the color recording head relative to the recording medium such as to complete a record image in a predetermined recording area including pixels on the recording medium by causing each of the black recording head and the color recording head to perform N (N being an integer equal to or greater than 2) recording scans in the same pixel;

data generating means, which, for each of the recording heads, generates image data for each of the N recording scans corresponding to the predetermined recording area, by using N mask patterns, for black image data corresponding to the N recording scans and N mask patterns for color image data corresponding to the N recording scans, so that black image data corresponding to the predetermined recording area are allotted to each of the N recording scans, and color image data corresponding to the predetermined recording area are allotted to each of the N the recording scans; and ink ejecting means for ejecting the black ink and the color ink from the black recording head and the color recording head during each of the recording scans on the basis of the data allotted to each of the recording scans by said generating means, wherein total allotment rate of the N mask patterns for the black image data is 100% and total allotment rate of the N mask patterns for the color image data is 100%, and an allotment rate of the mask pattern for the black image data used in a given one of the N recording scans is smaller than 100% and is greater than a reference allotment rate, the reference allotment rate being (100/N)%, and an allotment rate of the mask pattern for the color image data used in that one recording scan is greater than 0% and is smaller than the reference allotment rate, and an allotment rate of the mask pattern for the black image data used in another recording scan is greater than 0% and is smaller than the reference allotment rate, and an allotment rate of the mask pattern for the color image data used in the latter recording scan is smaller than 100% and greater than the reference allotment rate.

2. A color ink-jet recording apparatus according to claim 1, wherein mask patterns having different allotment rates are used as the mask patterns for the black image data and color image data.

3. A color ink-jet recording apparatus according to claim 1, wherein when a black image is to be formed in said predetermined area, before or after the black ink is caused to impact the recording medium, at least one of the plural types of color ink is caused to impact locations onto which the black ink is ejected.

4. A color ink-jet recording apparatus according to claim 1, further comprising a thinning means, which thins the black image data at a predetermined thinning rate and causes the plural types of color ink to impact portions of the recording area in which the black image data has been thinned.

5. A color ink-jet recording apparatus according to claim 1, wherein at least one of the plural types of color ink is reactive and tends to cause the black ink to solidify or cohere when contacting with the black ink.

6. A color ink-jet recording apparatus according to claim 1, wherein said recording heads execute recording only during scans in one of the forward and backward scanning directions, and in the scanning direction in which the recording is carried out, said color recording heads are arranged in front of said black recording head.

7. A color ink-jet recording apparatus according to claim 1, wherein if said recording heads carry out recording in both the forward and backward scanning directions, then during the first recording scan, the color image data has a higher allotment rate than the black image data.

8. A color ink-jet recording apparatus according to claim 1, wherein the plural color ink types include cyan, magenta, and yellow ink.

9. A color ink-jet recording apparatus according to claim 1, wherein said recording heads apply thermal energy to generate bubbles in the ink so that energy generated by the bubbles causes the ink to be ejected.

10. A color ink-jet recording apparatus according to claim 1, wherein the allotment rate of the mask pattern for the black image data used in one recording scan of two recording scans among the plurality of recording scans is different from the allotment rate of the mask pattern for the black image data used in the other recording scan of the two recording scans.

11. A color ink-jet recording apparatus according to claim 1, wherein the allotment rate of the mask pattern for the color image data used in one recording scan of two recording scans among the plurality of recording scans is different form the allotment rate of the mask pattern for the color image data used in the other recording scan of the two recording scans.

12. A color ink-jet recording method using a black recording head that ejects black ink on the basis of black image data and a color recording head that ejects color ink on the basis of color image data, the color ink permeating through a recording medium at a higher speed than the black ink, the method comprising the steps of:

controlling scanning of the black recording head and of the color recording head relative to the recording medium such as to complete a record image in a predetermined recording area including pixels on the recording medium by causing each of the black recording head and the color recording head to perform N (N being an integer equal to or greater than 2) recording scans in the same pixel;

for each of the recording heads, generating image data for each of the N recording scans corresponding to the predetermined recording area, by using N mask patterns, for black image data corresponding to the N recording scans and N mask patterns for color image data corresponding to the N recording scans, so that black image data corresponding to the predetermined recording area are allotted to each of the N recording scans, and color image data corresponding to the predetermined recording area are allotted to each of the N the recording scans; and ejecting the black ink and the color ink from the black recording head and the color recording head during each of the recording scans on the basis of the data allotted to each of the recording scans in said generating steps, wherein total allotment rate of the N mask patterns for the black image data is 100% and total allotment rate of the N mask patterns for the color image data is 100%, and an allotment rate of the mask pattern for the black image data used in a given one of the N recording scans is smaller than 100% and is greater than a reference allotment rate, the reference allotment rate being (100/N)%, and an allotment rate of the mask pattern for the color image data used in that one recording scan is greater than 0% and is smaller than the reference allotment rate, and an allotment rate of the mask pattern for the black image data used in another recording scan is greater than 0% and is smaller than the reference allotment rate, and an allotment rate of the mask pattern for the color image data used in the latter recording scan is smaller than 100% and greater than the reference allotment rate.

13. A color ink-jet recording method according to claim 12, wherein when a black image is to be formed in the aid predetermined area, before or after the black ink is caused to impact the recording medium, at least one of the plural types of color ink is caused to impact locations onto which the black ink is ejected.

14. A color ink-jet recording method according to claim 12, further comprising a thinning step, which thins the black image data at a predetermined thinning rate and causes the plural types of color ink to impact portions of the recording area in which the black image data has been thinned.

15. A color ink-jet recording method according to claim 12, wherein at least one of the plural types of color ink is reactive and tends to cause the black ink to solidify or cohere when contacting with the black ink.

16. A color ink-jet recording method according to claim 12, wherein if the recording heads carry out recording in both the forward and backward scanning directions, then during the first recording scan, the color image data has a higher allotment rate than the black image data.

17. A method of processing image data used in a color ink-jet recording apparatus using a black recording head that ejects black ink on the basis of black image data and a color recording head that ejects color ink on the basis of color image data, the color ink permeating through a recording medium at a higher speed than the black ink, said method comprising the steps of:

controlling scanning of the black recording head and of the color recording head relative to the recording medium such as to complete a record image in a predetermined recording area including pixels on the recording medium by causing each of the black recording head and the color recording head to perform N (N being an integer equal to or greater than 2) recording scans in the same pixel; and for each of the recording heads, generating image data for each of the N recording scans corresponding to the predetermined recording area, by using N mask patterns, for black image data corresponding to the N recording scans and N mask patterns for color image data corresponding to the N recording scans, so that black image data corresponding to the predetermined recording area are allotted to each of the N recording scans, and color image data corresponding to the predetermined recording area are allotted to each of the N the recording scans, wherein total allotment rate of the N mask patterns for the black image data is 100% and total allotment rate of the N mask patterns for the color image data is 100%, and an allotment rate of the mask pattern for the black image data used in a given one of the N recording scans is smaller than 100% and is greater than a reference allotment rate, the reference allotment rate being (100/N)%, and an allotment rate of the mask pattern for the color image data used in that one recording scan is greater than 0% and is smaller than the reference allotment rate, and an allotment rate of the mask pattern for the black image data used in another recording scan is greater than 0% and is smaller than the reference allotment rate, and an allotment rate of the mask pattern for the color image data used in the latter recording scan is smaller than 100% and greater than the reference allotment rate.

18. A program for executing image processing on image data used in a color ink-jet recording apparatus using a black recording head that ejects black ink on the basis of black image data and a color recording head that ejects color ink on the basis of color image data, the color ink permeating through a recording medium at a higher speed than the black ink, the program comprising the steps of:

controlling scanning of the black recording head and of the color recording head relative to the recording medium such as to complete a record image in a predetermined recording area including pixels on the recording medium by causing each of the black recording head and the color recording head to perform N (N being an integer equal to or greater than 2) recording scans in the same pixel; and for each of the recording heads, generating image data for each of the N recording scans corresponding to the predetermined recording area, by using N mask patterns, for black image data corresponding to the N recording scans and N mask patterns for color image data corresponding to the N recording scans, so that black image data corresponding to the predetermined recording area are allotted to each of the N recording scans, and color image data corresponding to the predetermined recording area are allotted to each of the N the recording scans, wherein total allotment rate of the N mask patterns for the black image data is 100% and total allotment rate of the N mask patterns for the color image data is 100%, and an allotment rate of the mask pattern for the black image data used in a given one of the N recording scans is smaller than 100% and is greater than a reference allotment rate, the reference allotment rate being (100/N)%, and an allotment rate of the mask pattern for the color image data used in that one recording scan is greater than 0% and is smaller than the reference allotment rate, and an allotment rate of the mask pattern for the black image data used in another recording scan is greater than 0% and is smaller than the reference allotment rate, and an allotment rate of the mask pattern for the color image data used in the latter recording scan is smaller than 100% and greater than the reference allotment rate.

19. A computer-readable storage medium storing the program set forth in claim 18.

20. A color ink-jet recording apparatus using a black recording head that ejects black ink on the basis of black image data and a color recording head that ejects color ink on the basis of color image data, the color ink permeating thorough a recording medium at a higher speed than the black ink, said apparatus comprising:

control means for controlling scanning of the black recording head and of the color recording head relative to the recording medium such as to complete a record image in a predetermined recording area including pixels on the recording medium by causing each of the black recording head and the color recording head to perform N (N being an integer equal to or greater than 2) recording scans in the same pixel; and data generating means, which, for each of the recording heads, generates image data for each of the N recording scans corresponding to the predetermined recording area, by using N mask patterns, for black image data corresponding to the N recording scans and N mask patterns for color image data corresponding to the N recording scans, so that black image data corresponding to the predetermined recording area are allotted to each of the N recording scans, and color image data corresponding to the predetermined recording area are allotted to each of the N the recording scans, wherein total allotment rate of the N mask patterns for the black image data is 100% and total allotment rate of the N mask patterns for the color image data is 100%, and an allotment rate of the mask pattern for the black image data used in a given one of the N recording scans is smaller than 100% and is greater than a reference allotment rate, the reference allotment rate being (100/N)%, and an allotment rate of the mask pattern for the color image data used in that one recording scan is greater than 0% and is smaller than the reference allotment rate, and an allotment rate of the mask pattern for the black image data used in another recording scan is greater than 0% and is smaller than the reference allotment rate, and an allotment rate of the mask pattern for the color image data used in the latter recording scan is smaller than 100% and greater than the reference allotment rate.

\* \* \* \* \*

UNITED STATES PATENT AND TRADEMARK OFFICE
CERTIFICATE OF CORRECTION

PATENT NO. : 7,121,641 B2
APPLICATION NO. : 10/067359
DATED : October 17, 2006
INVENTOR(S) : Masaki Nitta et al.

It is certified that error appears in the above-identified patent and that said Letters Patent is hereby corrected as shown below:

<u>COLUMN 1</u>:

Line 30, "executes" should read --execute--.

<u>COLUMN 2</u>:

Line 20, "media" should read --medium--; and
Line 38, "solves" should read --solve--.

<u>COLUMN 4</u>:

Line 29, "performs" should read --perform--.

<u>COLUMN 9</u>:

Line 20, "to be" should read --is--.

<u>COLUMN 11</u>:

Line 54, "6A," should read --6A is used,--.

<u>COLUMN 12</u>:

Line 37, "appears" should read --appear--.

<u>COLUMN 14</u>:

Line 12, "is" should read --are--;
Line 37, "patters" should read --patterns--;
Line 58, "through" should read --though--; and
Line 64, "color" should read --color is prevented--.

<u>COLUMN 16</u>:

Line 28, "FIGS. 9 to 11 and FIGS." should read --FIGS. 1A-1D, FIGS. 5A-5D, FIGS. 6A-6E, FIGS. 7A-7F, FIGS. 8A-8F, FIGS. 9A-9C, FIGS. 10A-10F, FIGS. 11A-11F, and FIGS. 12A-12F,--; and
Line 29, "15 to 21," should be deleted.

UNITED STATES PATENT AND TRADEMARK OFFICE
CERTIFICATE OF CORRECTION

PATENT NO. : 7,121,641 B2
APPLICATION NO. : 10/067359
DATED : October 17, 2006
INVENTOR(S) : Masaki Nitta et al.

It is certified that error appears in the above-identified patent and that said Letters Patent is hereby corrected as shown below:

COLUMN 17:

Line 10, "apparent" should read --following--; and
Line 38, "the N the" should read --the N--.

COLUMN 18:

Line 43, "form" should read --from--.

COLUMN 19:

Line 3, "the" should be deleted;
Line 8, "steps," should read --step--; and
Line 27, "the aid" should read --said--.

COLUMN 20:

Line 4, "the" should be deleted; and
Line 47, "the" should be deleted.

COLUMN 21:

Line 5, "thorough" should read --through--.

UNITED STATES PATENT AND TRADEMARK OFFICE
CERTIFICATE OF CORRECTION

| | | |
|---|---|---|
| PATENT NO. | : 7,121,641 B2 | Page 3 of 3 |
| APPLICATION NO. | : 10/067359 | |
| DATED | : October 17, 2006 | |
| INVENTOR(S) | : Masaki Nitta et al. | |

It is certified that error appears in the above-identified patent and that said Letters Patent is hereby corrected as shown below:

COLUMN 22:

Line 3, "the N the" should read --the N--.

Signed and Sealed this

Tenth Day of April, 2007

JON W. DUDAS
*Director of the United States Patent and Trademark Office*